United States Patent [19]

Toulios et al.

[11] 4,283,989
[45] Aug. 18, 1981

[54] DOPPLER-TYPE PROJECTILE VELOCITY MEASUREMENT AND COMMUNICATION APPARATUS, AND METHOD

[75] Inventors: Peter P. Toulios, Oakbrook; Kenneth D. Hartman, DeKalb, both of Ill.

[73] Assignee: ARES, Inc., Port Clinton, Ohio

[21] Appl. No.: 62,558

[22] Filed: Jul. 31, 1979

[51] Int. Cl.³ .............................................. F41C 17/00
[52] U.S. Cl. ........................................ 89/6.5; 73/167; 343/7.6; 343/8
[58] Field of Search ............................ 73/167; 89/6.5; 343/7.6, 8

[56] References Cited

U.S. PATENT DOCUMENTS

| | | | |
|---|---|---|---|
| 2,691,761 | 10/1954 | Smith | 73/167 |
| 2,735,981 | 2/1956 | Schutz et al. | 73/167 |
| 3,659,201 | 4/1972 | Vogelsang | 73/167 |
| 3,918,061 | 11/1975 | Elgaard | 73/167 |

Primary Examiner—Stephen C. Bentley
Attorney, Agent, or Firm—Allan R. Fowler

[57] ABSTRACT

Projectile velocity measurement and communication apparatus comprises a microwave probe fixed to a projectile barrel near a muzzle end. An oscillator, having a reference frequency selected for exciting a fundamental electromagnetic mode in the barrel, is connected to the probe through a hybrid mixer configured for extracting, from moving projectile-reflected microwaves, a true Doppler signal having a varying frequency related to projectile barrel velocity. A processor, connected for receiving the Doppler signal, measures, by a clock oscillator, Doppler signal periods (half periods). A data presorter in the processor selects a last "N" number of period measurements before the projectile reaches an interference position relative to the probe, to be fed to a fire control computer interface for determination therein of projectile barrel and muzzle velocities, calibration means being provided to update barrel diameter values used in such determination. An alternative, dual reference frequency variation is described, in which a dual hybrid mixer provides two independent Doppler signals, to eliminate dependency of projectile velocity determinations on barrel diameter. A reference frequency modulator and control means therefor are provided to enable microwave communication of information to the projectile, for example, of projectile target time of flight for fusing purposes. Corresponding methods for projectile velocity measurement and communication are provided.

30 Claims, 19 Drawing Figures

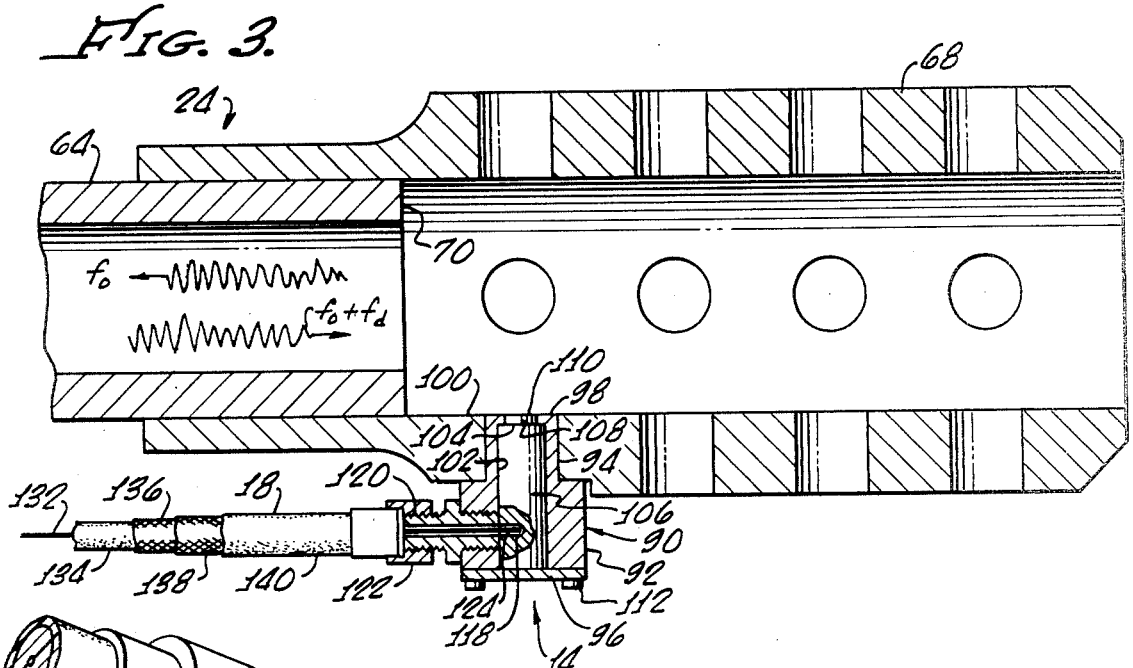
Fig. 3.
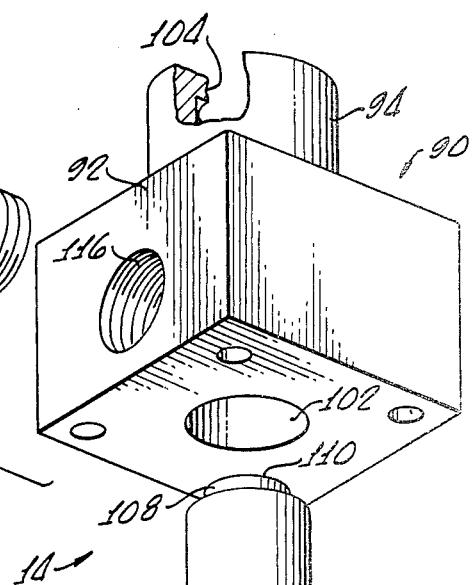
Fig. 4.
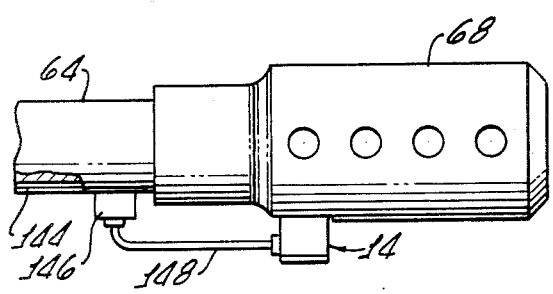
Fig. 5.
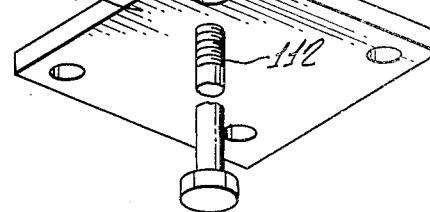

Fig. 17.

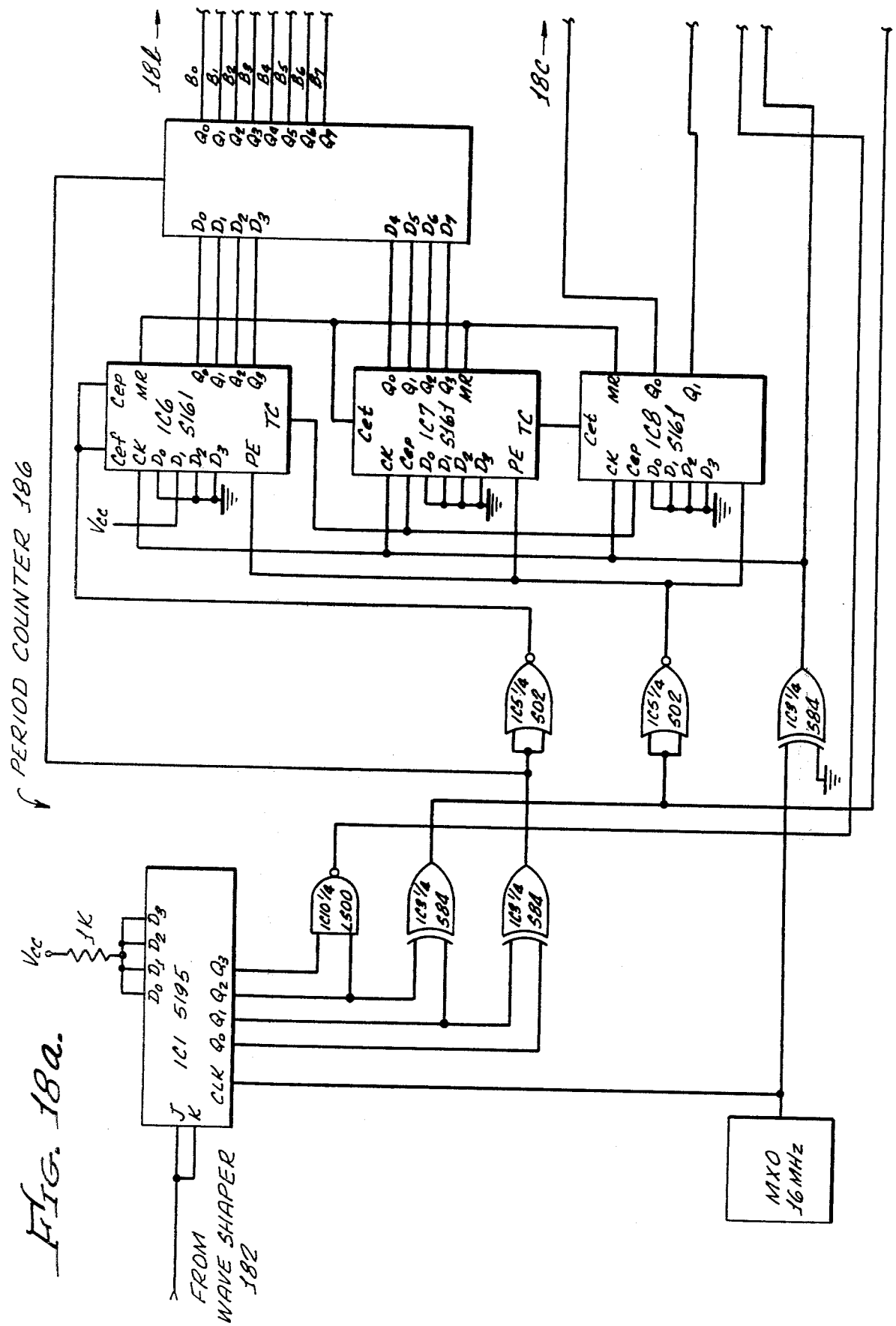

Fig. 18b.

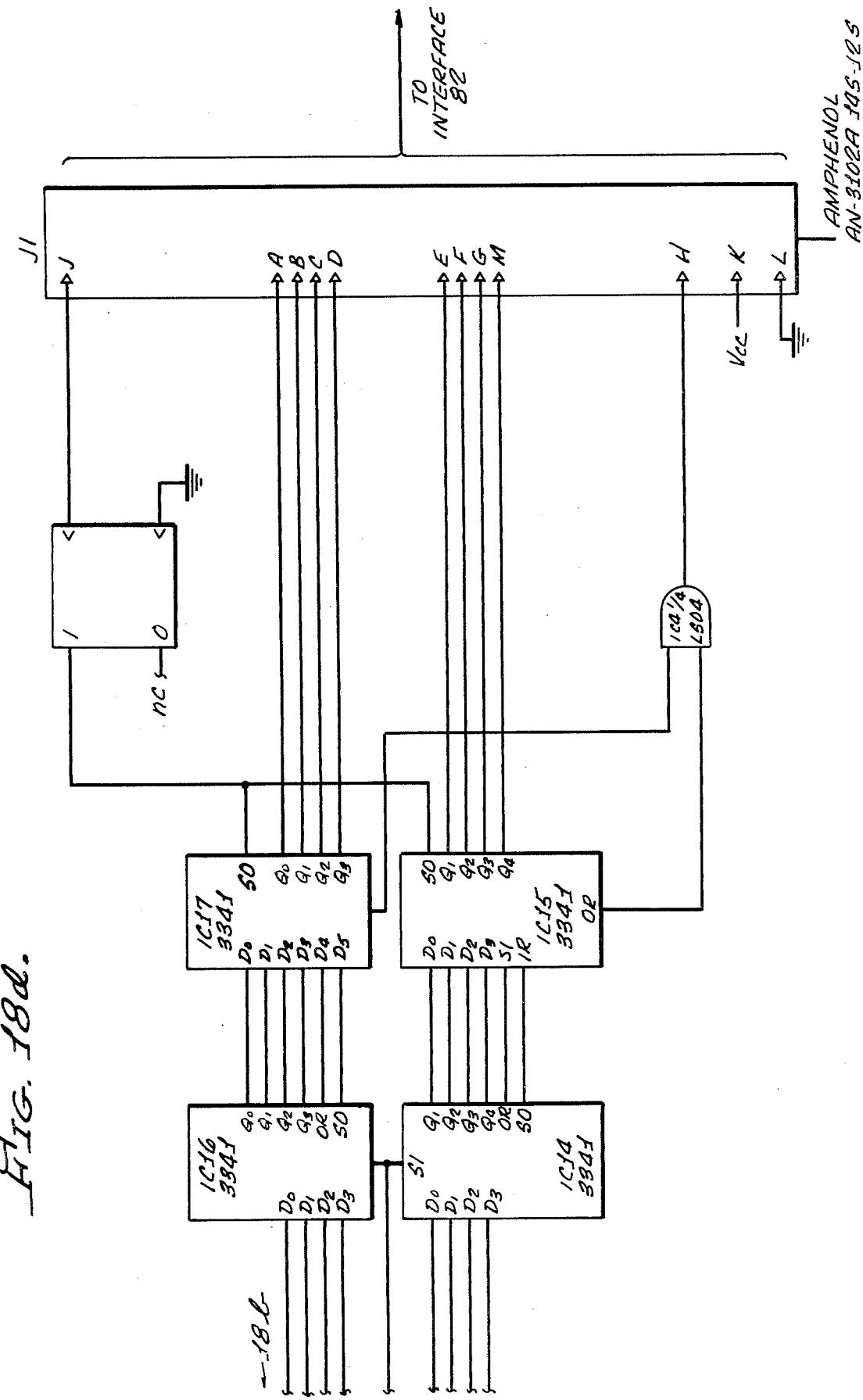

DOPPLER-TYPE PROJECTILE VELOCITY MEASUREMENT AND COMMUNICATION APPARATUS, AND METHOD

The present invention relates generally to the field of projectile muzzle velocity measuring apparatus and more particularly to microwave Doppler muzzle velocity measuring apparatus using at least portions of the projectile barrel as a waveguide.

An extremely difficult role in modern warfare is defending targets against low level, relatively close-in attack by enemy aircraft. Because of problems in detecting low flying aircraft at sufficiently far distances enabling effective use of surface-to-air missiles, this defensive role is typically assigned to antiaircraft weapons systems utilizing rapid fire, moderate calibre, automatic cannon.

As a result of tradeoffs among such factors as range, trajectory, and firepower, automatic cannon in the range of 30–40 mm are most commonly used for this role. Such cannon, although normally fired only in 10–20 round bursts because of usually limited shell supply, typically have instantaneous firing rates of about 500–600 rounds per minute. Although maximum hit range of the cannon is about 5000 meters, when used against low level aircraft flying at speeds of about Mach 1 (about 340 meters per second) the most effective hit range has been found to be between about 1000 and 3000 meters.

These antiaircraft gun systems, normally each including at least a pair of automatic cannon, are commonly directed by automatic fire control systems, which include a fire control computer linked to target tracking and gun drive subsystems. In response to continually updated target aircraft position and range data from the tracking subsystem, the fire control computer predicts a projectile-target aircraft intercept path and directs movement of the guns along a corresponding lead and superelevation aiming path.

In this regard, a key parameter greatly affecting system effectiveness is projectile time of flight to an intended target, such time, in conjunction with target range and projected flight path, enabling computation of necessary gun lead and superelevation at the instant of firing. Assuming, for illustrative purposes, a target aircraft range of 3000 meters, since denying close target aircraft penetration is an important objective, projectile time of flight is typically in the approximate range of 5–6 seconds. In this ragard, although the projectiles may have a muzzle velocity, for example, on the order of 1230 meters per second (4000 feet per second), indicative of a much shorter time of flight, air resistance causes projectile deceleration to an extent that average projectile velocity during the time of flight is substantially less than muzzle velocity.

Assuming the mentioned 5–6 seconds projectile time of flight, it is easily calculated that target aircraft at 3000 meters flying at Mach 1 (at right angles to the cannon) must be lead by almost a mile. Accordingly, assuming the associated fire control system has capability for accurately predicting, based on recent tracking data, the near future path of the target aircraft, an even slightly inaccurate value for the projectile flight time used to determine gun lead and superelevation obviously results in the projectile missing the target aircraft. For the above conditions, an error in projectile flight time as small as 0.03 seconds (about a 0.5 percent error) can be seen to result in missing a Mach 1 target aircraft by 20 meters. Since proximity fuses are not ordinarily used on projectiles of the calibre mentioned, even such a close miss is generally ineffective.

Before projectile flight time can be accurately determined or calculated, projectile muzzle velocity must ordinarily be precisely known. Knowing muzzle velocity and target range, shell manufacturers' (or experimentally determined) ballistic tables available in the fire control computer memory are typically consulted to obtain projectile time of flight. Such ballistic data may include corrections for ambient variables affecting projectile time of flight, including air temperature and atmospheric pressure.

Rather than actually measuring muzzle velocity, relatively unsophisticated antiaircraft cannon systems usually rely upon nominal projectile muzzle velocity data provided by shell manufacturers. However, more sophisticated gun systems include means for measuring projectile muzzle velocity, since barrel characteristics, such as length, amount of wear and expansion due to ambient temperatures or firing, may appreciably affect projectile velocity and cause actual muzzle velocity to be substantially different from the shell manufacturers' nominal data.

It is apparent that actual projectile velocity measurements are ordinarily made too late to be used for calculating time of flight, and hence for gun aiming, for the fired projectile. Thus, a statistical approach is ordinarily followed, muzzle velocity measurements for all projectile fired in a burst, for example, being averaged by the fire control computer for use as the muzzle velocity value for the next burst, with suitable compensation sometimes being made for such changed conditions as barrel thermal expansion.

For single projectile firing, at least in laboratory or range test situations, projectile muzzle velocity can ordinarily be easily measured with conventional wire grid or screen chronographs in which projectiles are fired through a pair of replaceable screens spaced a measured distance apart beyond the barrel muzzle. From sequential electrical signals generated when wires in the two screens are contacted and/or broken and the particular (measured) screen spacing, average projectile velocity between the screens can easily be calculated.

Although simple in concept, errors in projectile velocity may be caused by flexibility of the screens and/or by relatively long rise times of the generated electrical signals, both effects causing unknown inaccuracy in determining projectile transit time between the screens. Even more importantly, however, because the chronograph screens must be positioned in the projectile line of fire and must, to be useful, be replaced after each individual projectile is fired, such chronographs obviously cannot be used either for rapid fire measurements or for military weapons systems in combat situations.

Similar chronographs are, or may be, constructed using spaced apart light or laser beams which are interrupted by a passing projectile. Associated therewith are photodetectors which produce electric signals when the beams are interrupted, projectile velocity being then calculated in the same manner as for screen type chronographs. However, smoke, gases and incompletely combusted propellent particles which accompany a fired projectile from the barrel tend to interfer with determination of the precise instant the light beams are interrupted by the projectile itself, and thus tend to cause inaccuracies in calculated projectile velocity. In addition, although the apparatus requires no replacement between firings, the large quantities of smoke, gases, etc. caused in burst firing make light beam chronographs unsuitable for other than single fire, laboratory or range uses, even if such apparatus could otherwise be adapted for military applications.

As a consequence of screen and beam chronographs being entirely unsuitable for combat military gun systems, other types of apparatus have been adapted for measuring projectile velocity for military cannon. An alternative type of apparatus used is formed of a pair of spaced apart magnetic induction coils fixed to the barrel just beyond the muzzle, so that a fired projectile passing through the coils generates a pair of time spaced electrical signals. As for screen or beam chronographs, projectile transit velocity is obtained by dividing the spacing between the coils by the time interval between generated electrical signals. Exemplary of such coil-type apparatus is that disclosed in U.S. Pat. No. 3,659,201 by Vogelsang.

Coil-type projectile velocity measuring apparatus, although more adaptable to rapid fire and combat situations, also have several serious disadvantages. A principle disadvantage is lack of measurement accuracy necessary for critical air defense weapons systems, caused by coil characteristics which provide relatively long rise times of the projectile generated signals, thereby introducing uncertainty as to the instant of projectile passage past coil reference points. Complicating the problem is the fact that the interval time is very short because the two coils must be spaced relatively closely together to minimize barrel overhang and reduce various structural problems.

Further, because of their exposed location, the coils are vulnerable to damage, including being shot away if slight misalignment occurs. In addition, often significant mass is added to the end of the barrel, thereby increasing barrel vibration and/or whipping during firing. This causes firing inaccuracies and tends to inhibit precise gun moving and aiming at high gun slue rates.

As an alternative to using such induction coils, other muzzle velocity apparatus have utilized, or attempted to utilize, pressure sensors, for example, piezoelectric sensors, mounted in longitudinally separated barrel apertures. Pressure spikes or pulses caused by a projectile passing the sensors generate electrical signals used to measure transit times between the sensors. In practice, however, high levels of shock and vibration caused by firing, as well as substantial pressure fluctuations in the air column preceding and following a fired projectile, typically cause such large numbers of spurious sensor signals that discrimination of actual projectile passage is, at best, difficult and unreliable. As a result, pressure responsive projectile velocity measuring apparatus are generally impractical and are hence seldom used on military guns.

With the development of precision radar during and following World War II, attempts have been made, with varying levels of success, to use generally conventional microwave radar techniques for accurately measuring projectile velocity. For discussion purposes, the related microwave radar apparatus can be divided into two general classes. One class of apparatus includes radar which tracks fired projectiles just after they leave the gun barrel while the second class comprises radar apparatus which "looks" down the barrel, from the muzzle end, at an approaching projectile and detects projectile movement, and hence projectile velocity, in the barrel.

An example of radar apparatus of the first mentioned class is disclosed in the United States Patent of Elgaard, No. 3,918,061. Generally conventional Doppler radar techniques, which measure projectile velocity by reflected microwave frequency shifts are described. In some weapon systems, the radar used for target tracking may also be used to track the fired projectiles and determine velocity thereof. In other systems, rather than determining projectile velocity, projectile miss distances may be determined for enabling an associated fire control computer to calculate aiming compensation for subsequently fired projectiles.

Although such muzzle velocity radar apparatus may be capable of providing relatively accurate results, some measurement inaccuracies may, nevertheless, be caused by interference with the radar by the muzzle blast of propellant particles and hot, highly pressured and presumably ionized gases which accompany the projectiles from the barrel.

Because of this cloud of ionized gases, the external radar typically must wait until the projectile is some distance from the barrel muzzle, and hence free of the cloud, before projectile velocity measurements can be made. Ordinarily, the determined projectile velocity must then be extrapolated back to the muzzle in order that conventional ballistic tables can be used to determine projectile target time of flight. The further the projectile is from the muzzle, the less accurate this extrapolation will be.

There remains the additional problem of determining how far from the barrel muzzle the projectile is when the velocity determinations are made, as is necessary whether or not velocity extrapolation back to the muzzle is required. Ordinarily, the Doppler radar used for velocity determination does not, in itself, have range determining capability. Accordingly, separate projectile range determination apparatus is necessary to determine, in cooperation with the Doppler radar, projectile range at the time velocity measurements are made, thus adding to system cost and complexity.

Another problem with such external Doppler radar is that because the radar antenna is necessarily offset from the barrel bore axis, parallax effects are encountered in determining projectile velocity. Projectile range at the points velocity measurements are made are again necessary to compensate for those parallax effects.

A still further disadvantage of such external projectile velocity determining radar is that the radar may interfere with, and be interfered with by, other nearby radar, such as similar projectile velocity radar on other weapons systems and target tracking radars. Also, the velocity determining radar is subject to enemy electronic countermeasures, such as jamming, and may, as well, be used by enemy weaponry target homing apparatus.

Also, because the projectile velocity data is obtained when the projectile is already some distance from the projectile barrel, subsequent communication with the projectile, for example, after projectile time of flight is determined for projectile fusing purposes, is generally impractical, at least without longer range communication apparatus, which further increases the mentioned interference, countermeasure an enemy weaponry homing problems.

Furthermore, at least the Doppler radar antenna, which must be mounted in an external, exposed location is highly vulnerable to damage, particularly in combat conditions.

Examples of the second general class of microwave muzzle velocity apparatus which "look" at projectiles during their barrel transit are disclosed in the United States Patents of Smith and of Schutz et al., Nos. 2,691,761 and 2,735,981, respectively. In these described apparatus, microwaves are introduced into the muzzle end of the barrel, the barrel functioning as a waveguide. Reflected standing waves in the barrel ahead of a fired projectile, caused by projectile movement, are detected and analyzed to determine projectile velocity characteristics within the barrel. An advantage of this type of radar apparatus over the previously discussed class is that the possibly interfering effects of muzzle blast and interference with or by nearby radars can be substantially eliminated.

Heretofore, however, microwave apparatus configured for determining projectile movement characteristics in the barrel, by treating the barrel as a waveguide, have not been capable of successful application to military weapons system in combat use for a number of reasons.

One reason for this lack of practical application in military gun systems has been that radar apparatus heretofore used have relied upon analysis of standing wave reflection characteristics as an indication of projectile displacement and have involved conventional amplitude modulation (AM) techniques. As a result, all or at least major portions of the microwave system must be completely isolated or physically decoupled from the gun barrel in order to avoid AM interference caused by firing shock and vibration, muzzle blast, and so forth. Such apparatus is thus, at best, limited to laboratory-type, range firing which permits the necessary isolation of the radar apparatus from the gun barrel and other portions of the gun. Even under these controlled conditions, however, the recoil movement of large calibre guns will generally be greater than that which can be accommodated by disclosed isolation techniques without generation of excessive AM noise. In addition, Schutz et al discloses use of microwave wavelengths smaller than the barrel diameter. This can result in spurious signals due to multimode of excitation in the barrel.

Both the Smith and Schutz et al patents also disclose apparatus having portions positioned beyond the barrel muzzle in the path of fired projectiles. Hence, these portions are shot away with each firing, making the apparatus further unsuitable for determining projectile movement characteristics either in rapid fire or combat situations. Still further, because of apparatus configuration, both the Smith and Schutz et al patents disclose necessity for making substantial apparatus adjustments between projectile firings.

Although, mention is made in the Smith patent of similarities for "Doppler" radar effects, use of the term "Doppler" by Smith does not connote true Doppler frequency shift, but merely the use of an external barrier (reflector) to establish a double standing wire, in contrast with a single standing wave achieved without the barrier. Thus, the disclosed apparatus is not adapted for true Doppler frequency measurements, since true Doppler radar utilizes Doppler frequency detection means rather than the disclosed AM technique associated with standing wave measurements. Accordingly, true Doppler frequency measurements cannot be made by the disclosed apparatus.

Also, as is true for the external Doppler radar projectile velocity determining apparatus, neither Schutz et al or Smith disclose means whereby their apparatus may be additionally, or alternatively, used in any manner to communicate with a projectile while the projectile is still in, or after the projectile has exited, the barrel.

To overcome these and other problems, in order to provide accurate, relatively low cost projectile velocity determining apparatus suitable for use in military combat gun systems, applicants have invented improved, true Doppler microwave radar apparatus which enables direct and continuous determination of velocity characteristics of fired projectiles traveling along an associated gun barrel. Because no gun-apparatus isolation is necessary, no portion of the apparatus is positioned in the projectile path and no pre-firing adjustments or calibrations between shots are required, applicants' apparatus is particularly adapted for automatic guns for which muzzle velocity of each projectile fired, including each projectile in a multi-projectile burst, is required.

Furthermore, since applicants' apparatus is relatively small and can be mounted directly to the gun system, the apparatus is specifically adapted for combat—as opposed to laboratory or test-use.

Applicants' apparatus is additionally capable of compensating for the fact that projectile velocities are usually determined while the projectile is still in the barrel; whereas, muzzle (exit) velocity is normally required. When only muzzle velocity is to be determined, as opposed to projectile velocity characteristics, Doppler data management is provided to enable processing only of essential data obtained in a selected barrel region near the muzzle.

Since projectile velocity depends indirectly on barrel diameter, compensation for change in barrel diameter, due to thermal expansion and contraction and barrel wear, is accommodated during processing of the Doppler frequency data used to determine projectile velocity. Alternatively, dependency of projectile velocity on barrel diameter is eliminated by a variation, dual input frequency apparatus which provides two simultaneous, independent Doppler signals which are used to determine a single series of projectile velocities.

Additionally and importantly, applicants' projectile velocity determining apparatus can be easily adapted to enable communication with a projectile, either before or after velocity data is obtained, while the projectile is still within the barrel or after the projectile has exited the barrel.

Accordingly, applicants' projectile barrel velocity determining apparatus, comprises a waveguide microwave probe and means adapted for fixing the probe to a projectile barrel adjacent to a muzzle end thereof with a probe inner end adjacent to, but out of the path of projectiles traveling through the barrel. Microwave oscillator means are connected to the probe for providing microwave energy thereto for introduction thereby into the barrel to which the probe is fixed, frequency of the oscillator means being selected to excite a fundamental electromagnetic mode in the barrel. Connected to the probe for receiving therefrom microwave energy reflected by a projectile traveling through the barrel, are mixer means which extract from the reflected energy a Doppler frequency signal corresponding to projectile barrel velocity. Processor means connected to the mixer means receive the Doppler signal therefrom and obtain from the Doppler signal the corresponding projectile barrel velocity.

More particularly, the processor means includes period counting means for making period measurements of the Doppler frequency signal, the corresponding projectile barrel velocities being determined from the period measurements. Preferably, to increase resolution, and hence increase accuracy of velocity determinations, half period measurements are made.

Also included in the processor means are presorting means for selecting a predetermined number, N, of the period (half period) measurements, corresponding to N barrel positions of an associated projectile approaching relatively closely to the probe, for use in determining a corresponding set of N projectile barrel velocities and means for extrapolating therefrom a projectile muzzle velocity. Means are also provided for data smoothing, for example, by best fitting of a line or curve thrugh th projectile velocity data to enable projectile barrel and muzzle velocity determinations to be made with greater accuracy.

Since the determined projectile velocities depend, through the reflected Doppler signal, on an electrically effective diameter of the projectile barrel, the processor means also includes means for compensating, when determining projectile velocities, for effective barrel diameter changes caused by thermal expansion/contraction and wear due to firing and passage of projectiles through the barrel.

Because true Doppler frequency effects, as opposed to effects of standing waves in the projectile barrel, are used for determining projectile barrel velocities, very accurate velocity determinations are enabled and interference by shock and vibration due to firing are minimal.

For such purposes as providing target and fusing information to the projectile for which velocity measurements are made, means may be included for communicating information to the projectile while the projectile is within transmitting range of the probe, the communicating means including means for selectively modulating the reference oscillator frequency to include the information to be communicated to the projectile.

To enhance capability for communicating information to the projectile after the projectile has exited the barrel and is in free flight, the communicating means includes means forming an outwardly flared aperture at the muzzle end of the barrel beyond the probe, the aperture forming an antenna for enhancing coupling of microwave energy, emitted into the barrel by the probe, into free space beyond the muzzle end.

To further extend the range of external communication with a projectile, means are provided for stepping the reference oscillator, after the Doppler frequency signal has been received by the processor means and the projectile reaches the probe, from the frequency selected to excite the fundamental electromagnetic mode in the barrel to a second frequency below the barrel cutoff frequency of the fundamental mode.

Projectile velocity dependency on effective barrel diameter is eliminated in a variation apparatus which comprises first and second reference oscillator means connected to the probe for providing microwave energy for introduction by the probe into the barrel, the first and second reference frequencies each being selected to excite a fundamental electromagnetic mode in the barrel, the frequencies being separated in frequency by about 100 MHz to 300 MHz.

Included in the dual frequency apparatus are dual mixer means connected to the probe for receiving therefrom microwave energy reflected from a projectile traveling through the barrel, and for separately extracting therefrom first and second Doppler frequency signals, associated with the first and second reference frequencies and separately corresponding to projectile barrel velocity. Corresponding dual processor means are connected to the dual mixer means for receiving the first and second Doppler frequency signals and for obtaining therefrom the corresponding projectile barrel velocities. The dual processor means includes period counting means for separately making period measurements of the first and second Doppler frequency signal for determination of the corresponding projectile barrel velocities.

As for the single frequency apparatus, the dual processor means includes presorting means for selecting a predetermined number, N of the period measurements for each set of Doppler period measurements, corresponding to N barrel positions of an associated projectile in which the projectile approaches relatively closely to the probe, the sets of N period measurements being used for determining a single corresponding set of N projectile barrel velocities independently of effective barrel diameter. Means for smoothing the projectile barrel velocities and extrapolating muzzle velocity are provided.

The dual frequency apparatus may also be provided with the projectile communication means mentioned above for the single frequency apparatus.

For some purposes not requiring projectile velocity characteristics, but requiring projectile communication independent projectile communicating apparatus may be provided, which comprises a waveguide microwave probe, means adapted for fixing the probe to a projectile barrel with a probe inner end adjacent to, but out of the path of projectiles traveling through the barrel, microwave reference oscillator means connected to the probe for providing microwave energy thereto for introduction thereby into the barrel to which the probe is fixed and means for selectively modulating the reference frequency for including therein information to be communicated to the projectile.

To enable communicating with a projectile while the projectile is still in the barrel, frequency of the oscillator means is selected to excite a fundamental electromagnetic mode in the barrel.

In contrast, for communicating with a projectile after the projectile has exited the barrel and is in free flight, frequency of the oscillator means is selected to be below the barrel cutoff frequency of the fundamental electromagnetic mode in the barrel. In addition, the muzzle end of the barrel includes means defining an outwardly flared aperture beyond the probe, the aperture forming an antenna enhancing coupling of microwave energy, introduced into the barrel by the probe, into free space beyond the muzzle end, thereby increasing the amount of microwave energy radiated outwardly from the barrel in the direction of the projectile and increasing the communicating range relative thereto.

Corresponding methods for determining projectile velocity and for communicating with a projectile are provided. Thus, a method for determining projectile barrel velocity comprises the steps of fixing a microwave probe to a projectile barrel, adjacent to a muzzle end thereof, with an end of the probe adjacent to, but out of the path of, projectiles traveling through the barrel; introducing into the barrel, through the probe, microwave energy at a reference frequency selected to propagate a fundamental electromagnetic mode in the barrel; receiving from the barrel, through the probe, microwave energy, at a reflected frequency, reflected from a projectile traveling through the barrel; mixing microwave energy at the reference and reflected frequencies and extracting from the reflected frequency a Doppler frequency signal related to projectile barrel velocity and projectile barrel position; and, determining from the Doppler frequency signal the related projectile barrel velocity as a function of projectile barrel position.

Included also are the steps of determining from the Doppler frequency signal at least a number N of related projectile barrel velocities as a function of projectile barrel position while the projectile is in the barrel and extrapolating from the N projectile barrel velocities a projectile muzzle velocity.

Determination of the projectile velocities preferably includes the intermediate step of measuring periods (or half periods) of the Doppler frequency signal.

For a single frequency apparatus, the step of compensating for changes in effective barrel diameter due to barrel thermal expansion/contraction and barrel wear due to firing before determining projectile barrel velocity from the Doppler frequency signal may be included.

For a dual frequency apparatus, the corresponding method comprises the steps of fixing a microwave probe to a projectile barrel, adjacent to a muzzle end thereof, with an end of the probe adjacent to, but out of the path of, projectiles traveling through the barrel; introducing into the barrel, through the probe, microwave energy at first and second reference frequencies each selected to propagate a fundamental electromagnetic mode in the barrel as determined by effective barrel diameter; and, receiving from the barrel, through the probe, microwave energy, at first and second frequencies related to the first and second reference frequencies, reflected from a projectile traveling through the barrel. Also included are the steps of mixing microwave energy at the reference and reflected frequencies and separately extracting from the reflected frequencies first and second Doppler frequency signals related to projectile barrel velocity and projectile barrel position and determining from the first and second Doppler frequency signals the related projectile barrel velocity as a function of projectile barrel position, independently from effects of effective barrel diameter.

The steps of determining from the first and second Doppler frequency signals at least a number, N, of related projectile barrel velocities, as a function of projectile barrel position, independently from effects of effective barrel diameter; and, extrapolating from the N projectile velocities a projectile muzzle velocity are included.

To enable communicating with a projectile, the single and dual frequency velocity determining methods include the step of modulating the reference frequency (or one of the two reference frequencies), preferably during portions of projectile travel for which projectile velocity is not to be determined, in a manner enabling communication of information to the projectile.

Communication while the projectile is still in the barrel may be enabled by receiving from the barrel, through the probe, microwave energy, at a reflected frequency, reflected from a projectile traveling through a preselected, partial barrel distance before the projectile reaches the probe; extracting a Doppler frequency signal from the reflected frequency and determining therefrom at least one corresponding projectile barrel velocity at a corresponding barrel position; extrapolating from the barrel velocity a projectile muzzle velocity and a projectile time of flight; and, modulating the reference frequency in a manner communicating information related to projectile time of flight to the projectile.

For communicating with the projectile after the projectile has left the barrel, the method includes the alternative step of forming a muzzle end of the barrel into a conical, antenna shape, the step of modulating the reference frequency including modulating the reference signal after the projectile has exited the barrel and is in free flight.

Also alternatively included may be the step of reducing the reference frequency to a frequency below the cutoff frequency of the fundamental mode in the barrel before modulating the signal to communicate the projectile when the projectile is outside the barrel in free flight.

Independently of projectile velocity determination, a method for microwave communication with a projectile, comprises the steps of fixing a microwave probe to a projectile barrel, adjacent to a muzzle end thereof, with an end of the probe adjacent to, but out of the path of, projectiles traveling through the barrel; introducing into the barrel, through the probe, microwave energy having a reference frequency selected to propagate a fundamental mode in the barrel; and, modulating the reference frequency in a manner enabling communication with the projectile while the projectile is still in the barrel.

For communicating with a projectile in free flight outside the barrel, the reference frequency is selected to be below a fundamental mode barrel cutoff frequency.

In addition, the step of forming a muzzle end of the barrel into a conical antenna shape for enhancing coupling of microwave energy from the barrel into free space beyond the barrel is added.

A better understanding of the present invention may be had from a consideration of the following detailed description, taken in conjunction with the accompanying drawings, in which:

FIG. 3 is longitudinal, cross-sectional view of a microwave transmitting and receiving probe portion of the muzzle velocity determining apparatus, showing mounting of the probe through a muzzle brake fixed to a cannon barrel;

FIG. 4 is an exploded, perspective drawing of the probe of FIG. 3, showing features thereof;

FIG. 5 is a partially cutaway drawing showing formation along a barrel of a waveguide-type microwave transmission line associated with the probe of FIGS. 3 and 4;

Figure 6:
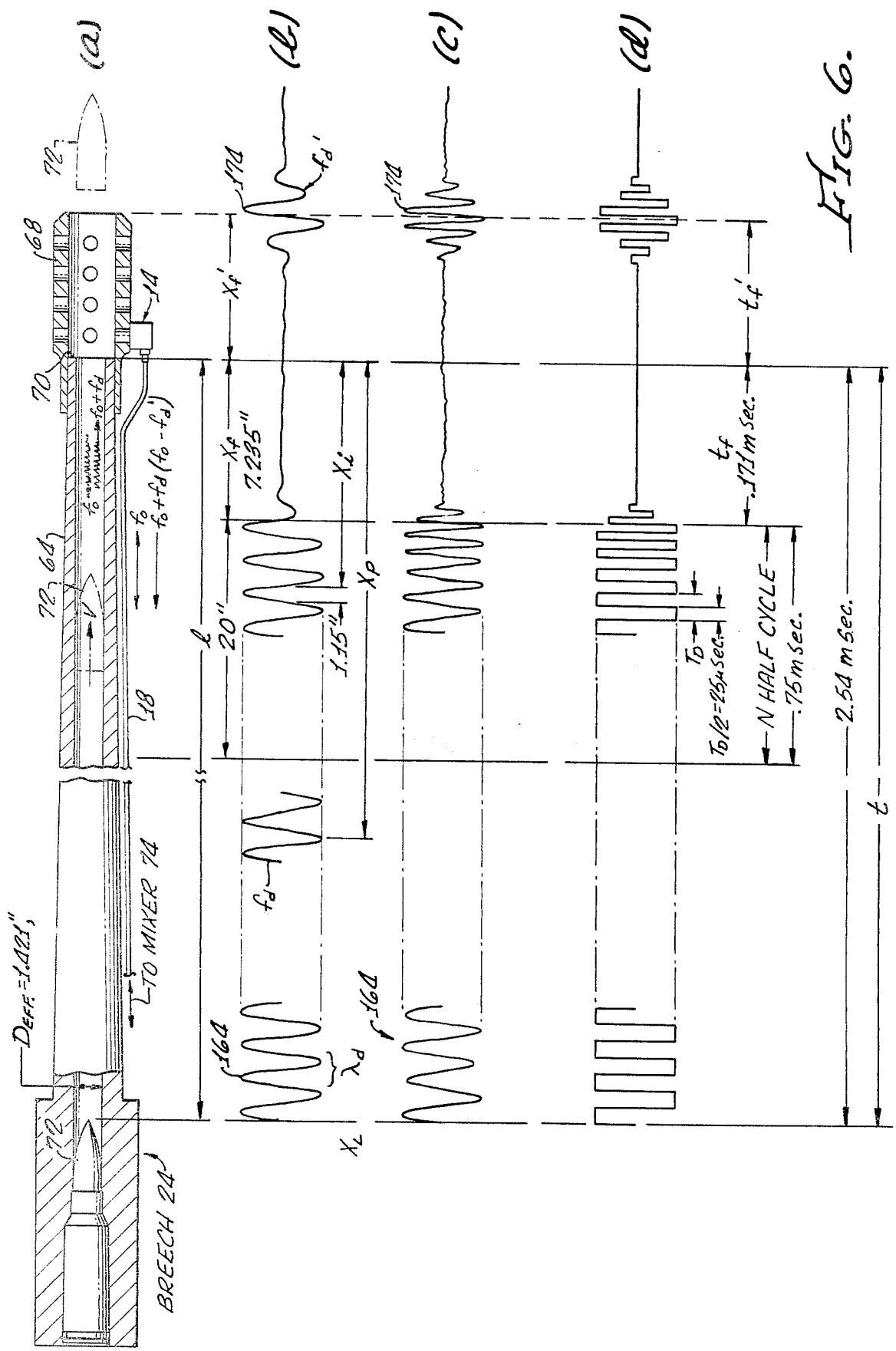

FIG. 6 is a schematic drawing of the cannon barrel of FIG. 3 and showing corresponding Doppler signals obtained by the muzzle velocity measuring apparatus, FIG. 6 (a) depicting the barrel and a projectile therein for reference purposes, FIG. 6 (b) depicting a typical, extracted Doppler signal, plotted on a space axis which corresponds to the barrel axis; FIG. 6 (c) depicting the typical Doppler signal plotted on a time axis corresponding to the space axis; and FIG. 6 (d) depicting the Doppler signal shaped into square wave form and plotted on the time axis of FIG. 6 (c).

Figure 2:
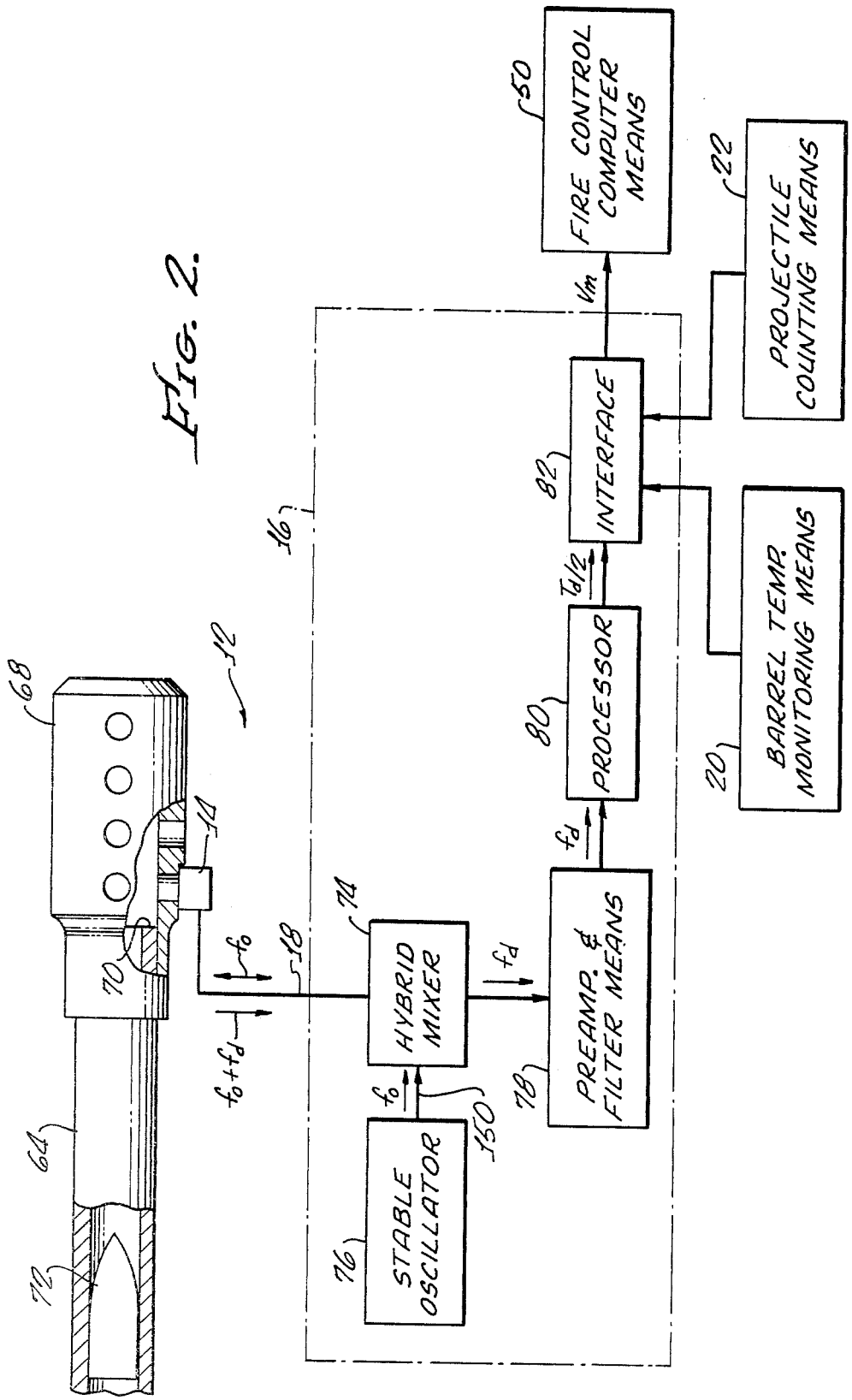
FIG. 2 is a drawing of the muzzle velocity determining apparatus of FIG. 1, showing the apparatus principally in functional block diagram form.
Figure 7:
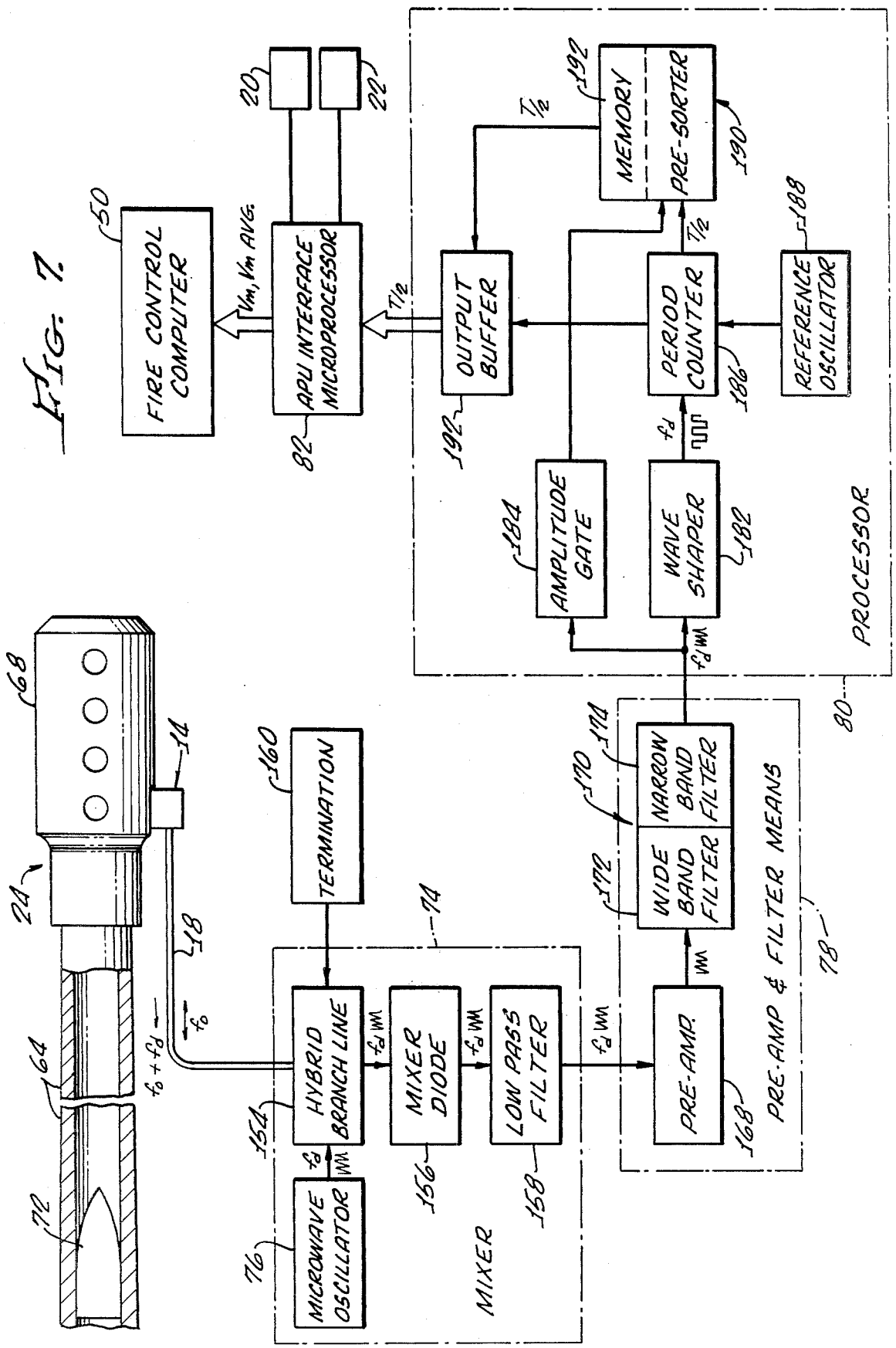
Figure 8:
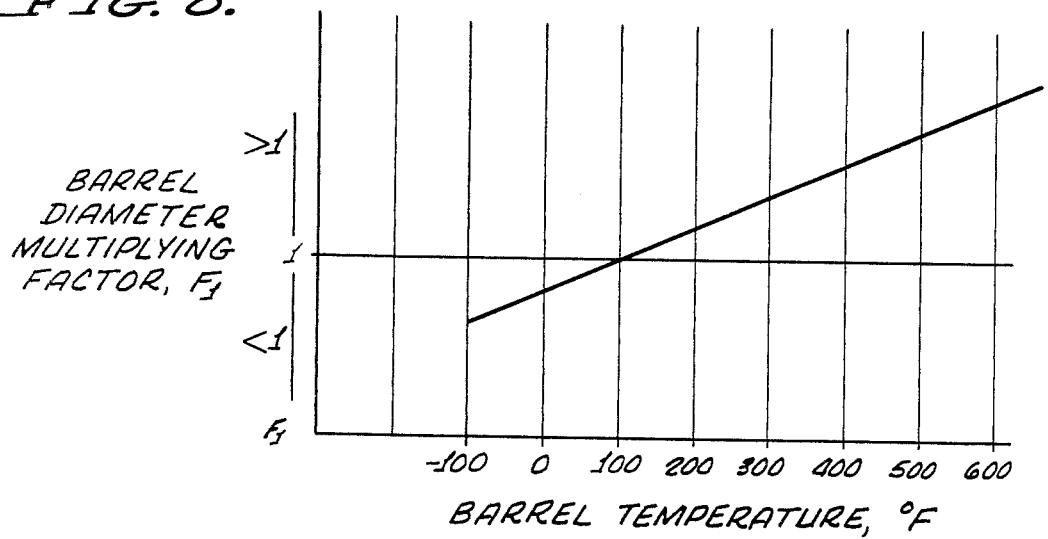
Figure 9:
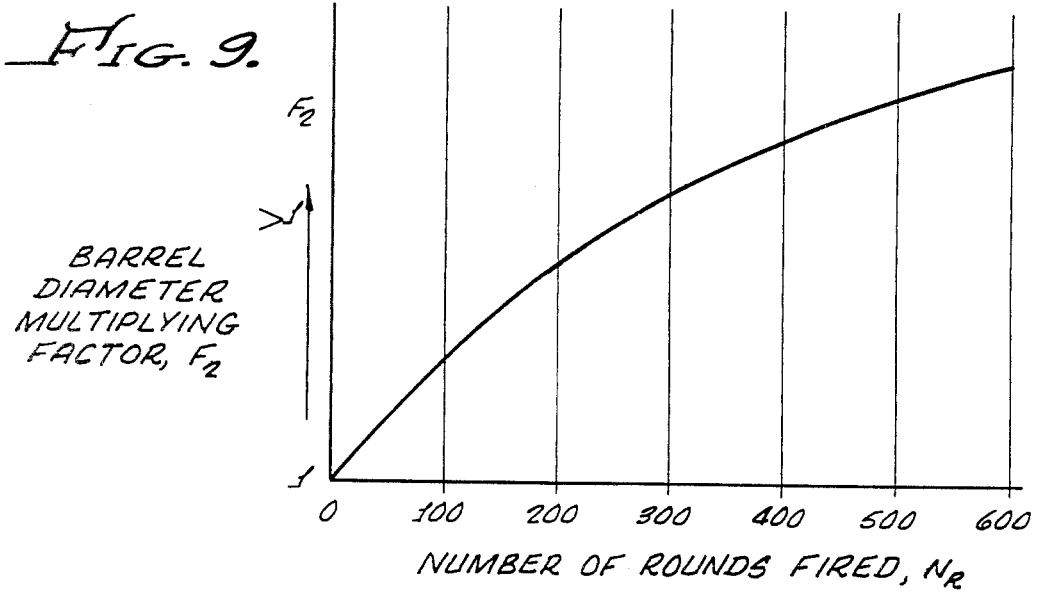
Figure 10:
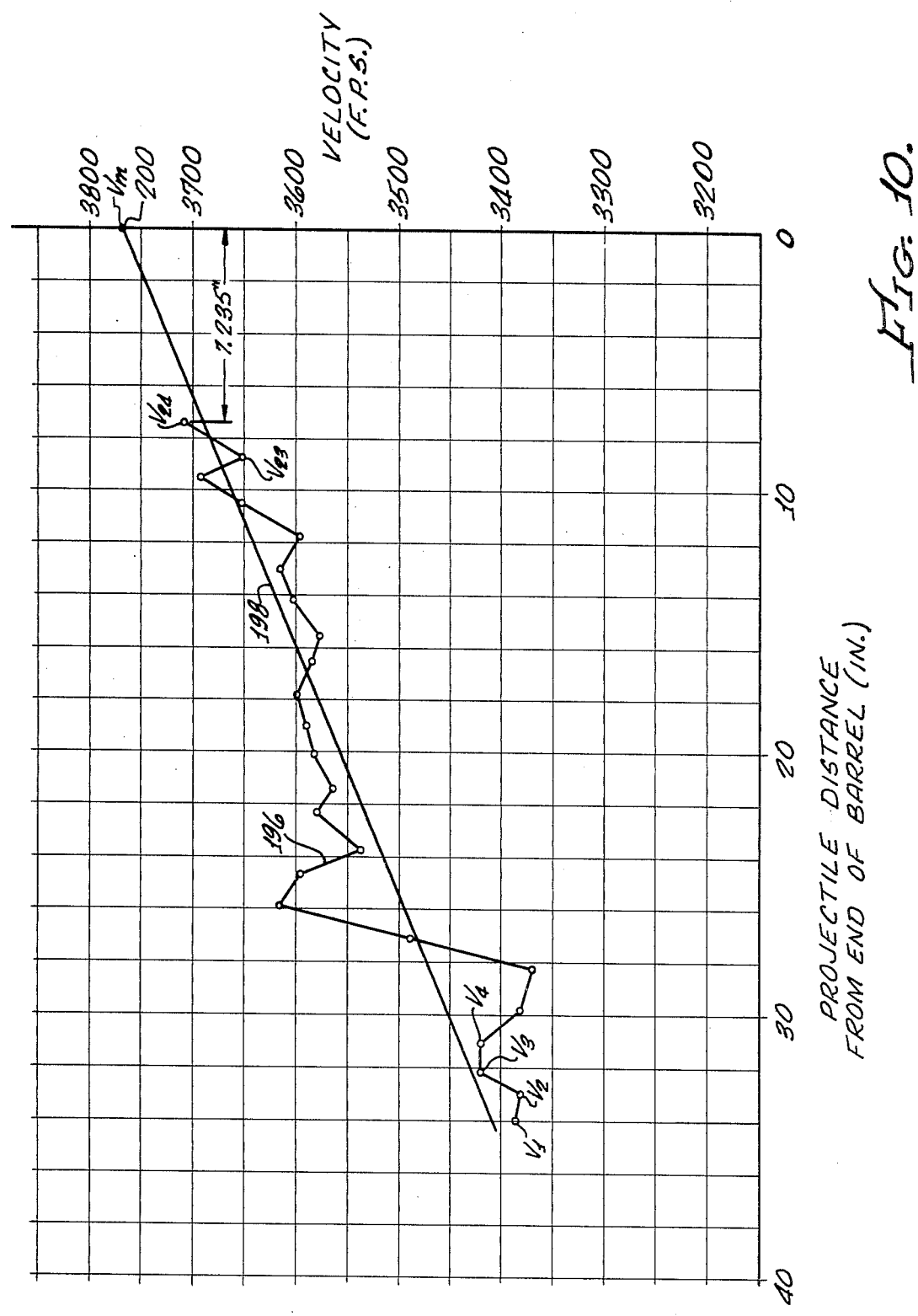
Figure 11:
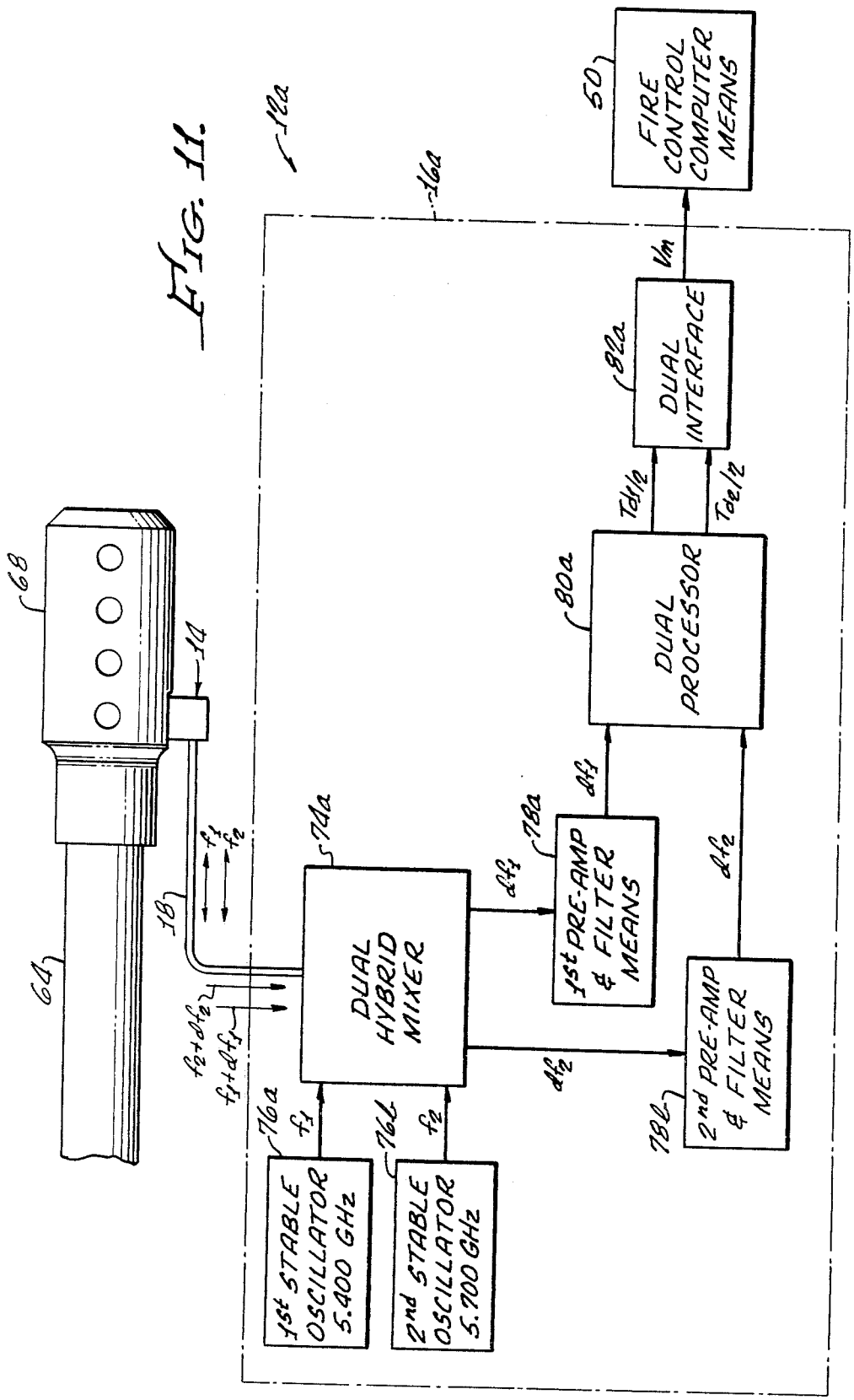
Figure 12:
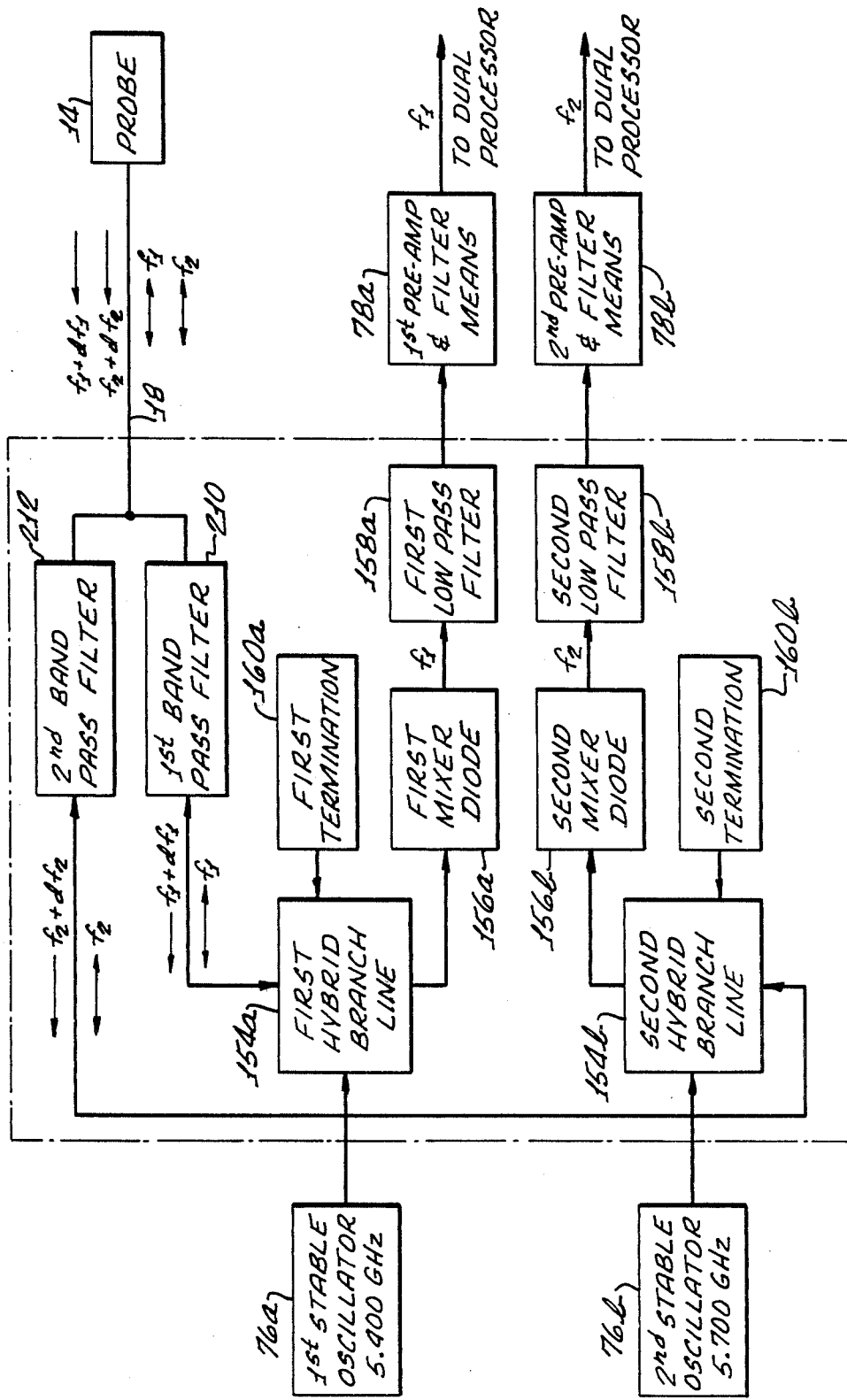
Figure 13:
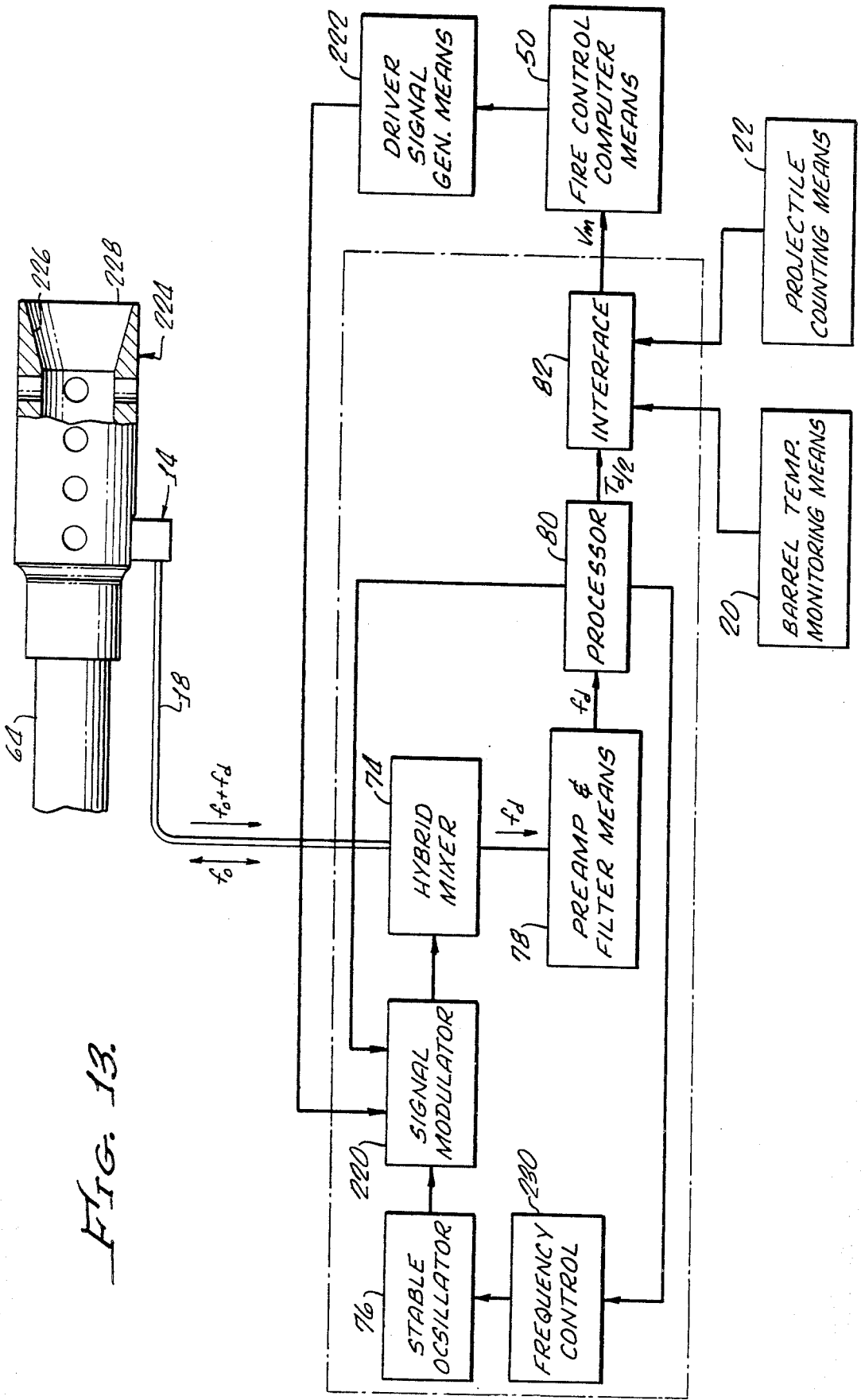
Figure 14:
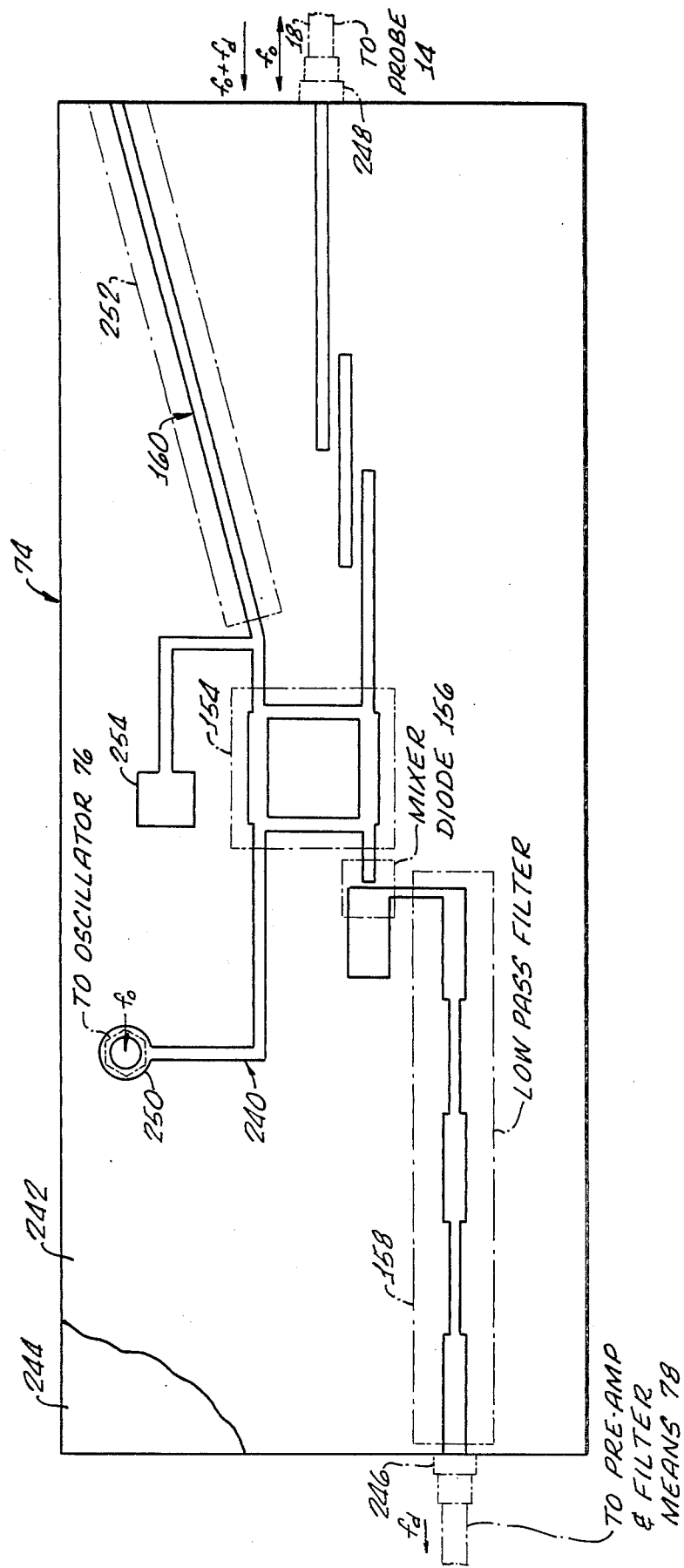
Figures 15, 16:
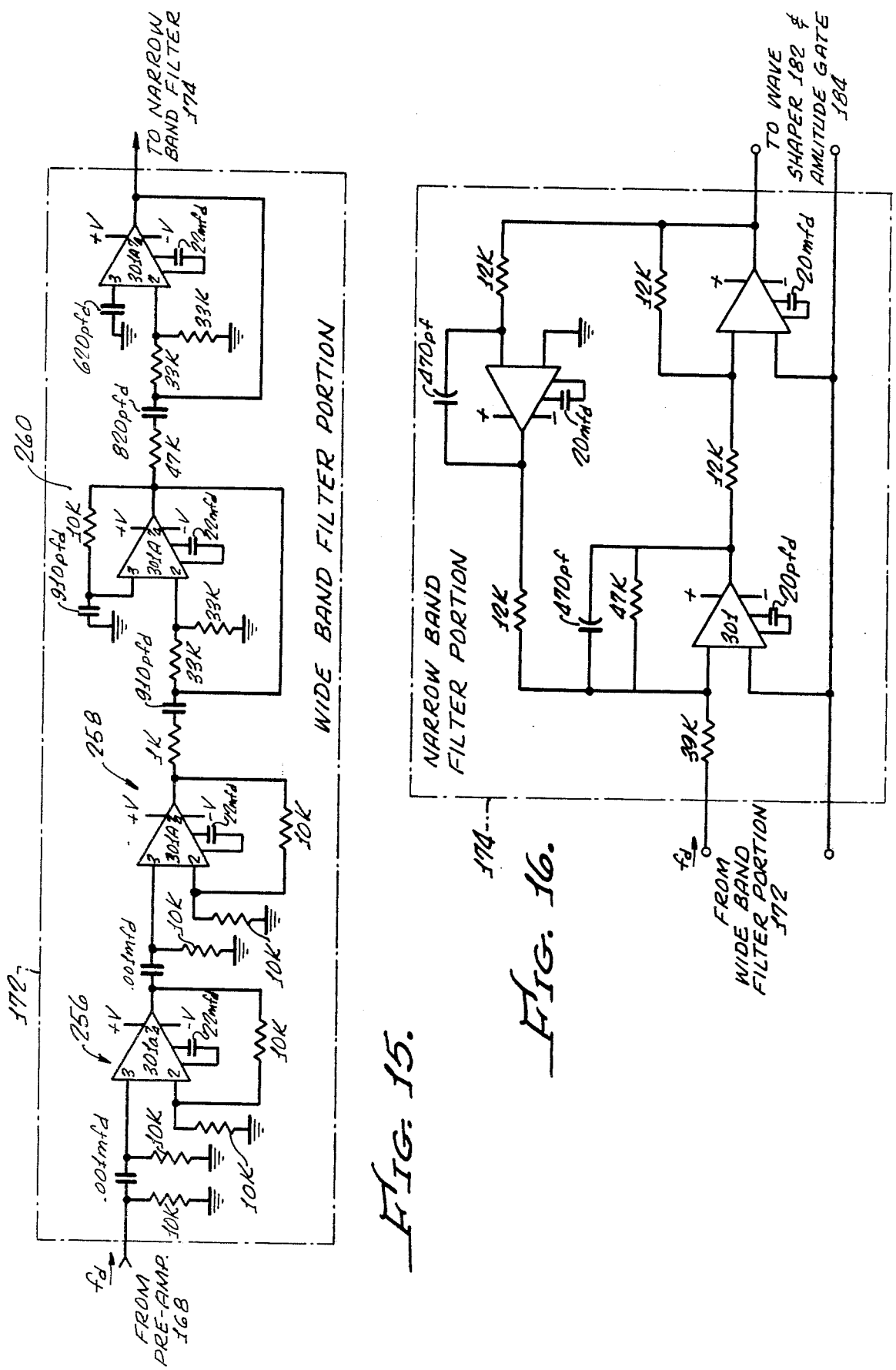
Figure 18C:
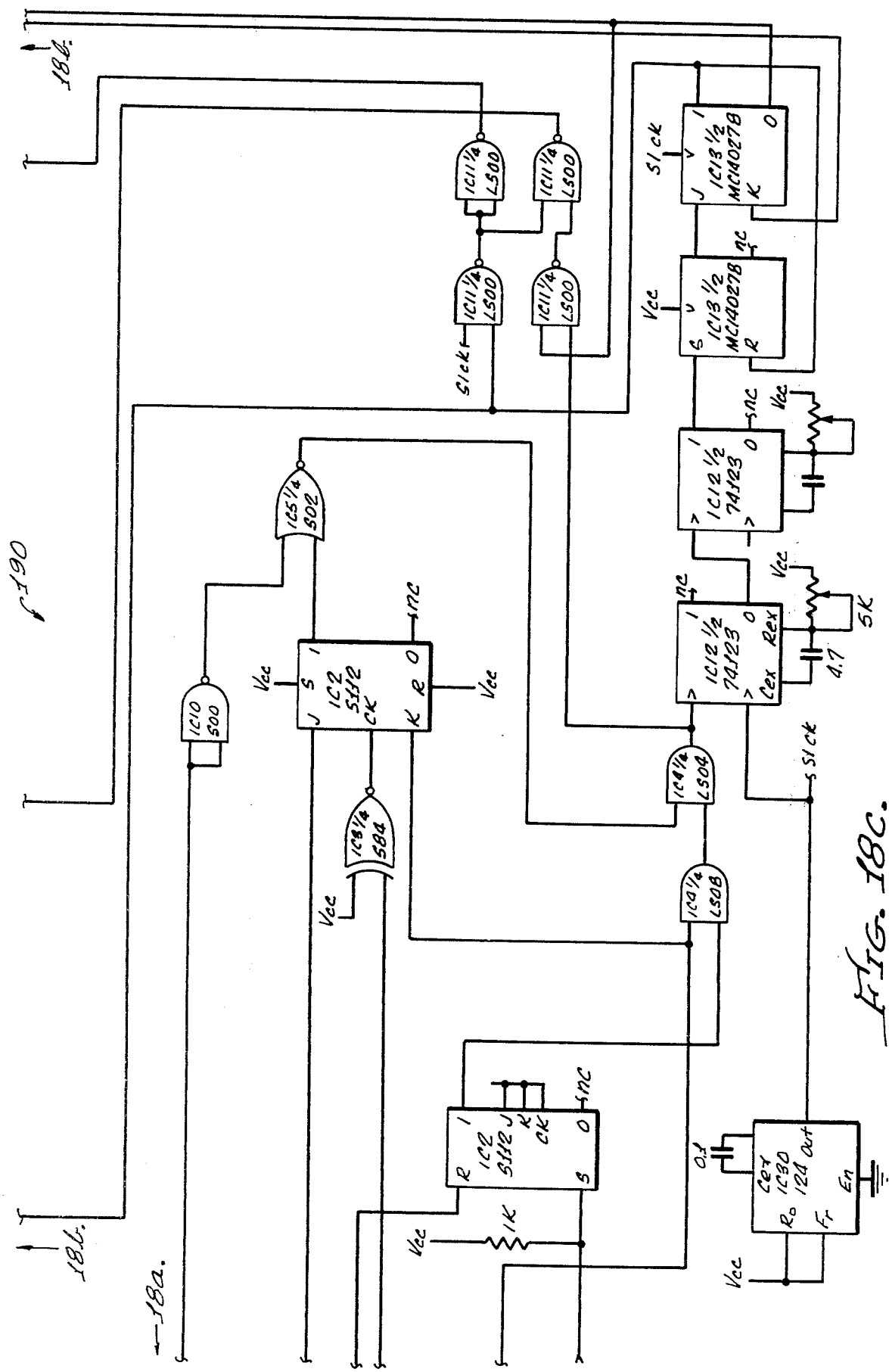
Figure 19:
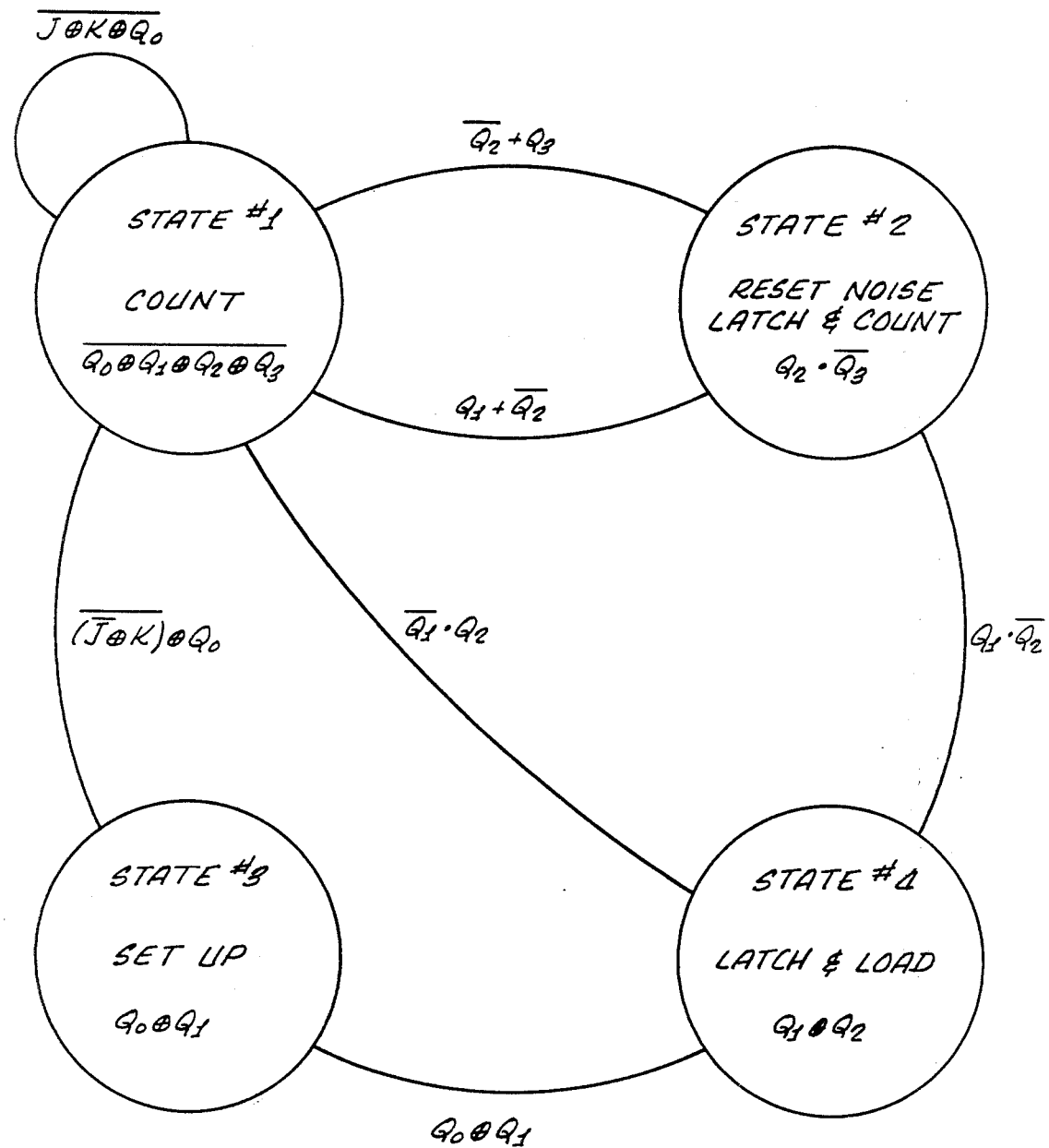

FIG. 7 is a functional block diagram of the muzzle velocity determining apparatus of FIG. 2, showing electrical functions thereof more specifically;

FIG. 8 is a plot of a first barrel diameter correction factor, $F_1$, variation with barrel temperature, showing representative barrel diameter change as a function of barrel temperature;

FIG. 9 is a plot of a second barrel diameter correction factor, $F_2$, variation with number of rounds fired through the barrel, showing representative barrel diameter change as a function of number of rounds fired;

FIG. 10 is a plot of a sequence of representative determined projectile velocities as a projectile approaches the microwave probe, showing fitting of a straight line through the data and extrapolation to determine muzzle velocity;

FIG. 11 is block diagram, similar to FIG. 2, showing in functional form a variation, dual frequency projectile velocity determining apparatus;

FIG. 12 is a functional block diagram of the dual frequency apparatus of FIG. 11, showing mixer portions thereof in greater detail;

FIG. 13 is a functional block diagram, similar to FIG. 2, showing modification of the projectile velocity measuring apparatus to enable communication with a projectile;

FIG. 14 is a representative microstrip circuit layout drawing of a hybrid mixer portion of the projectile velocity determining apparatus of FIG. 2;

FIG. 15 is a representative electrical schematic drawing of a wideband filter portion of the projectile velocity measuring apparatus of FIG. 2;

FIG. 16 is a representative electrical schematic drawing of a narrowband filter portion of the projectile velocity measuring apparatus of FIG. 2;

Figure 17:
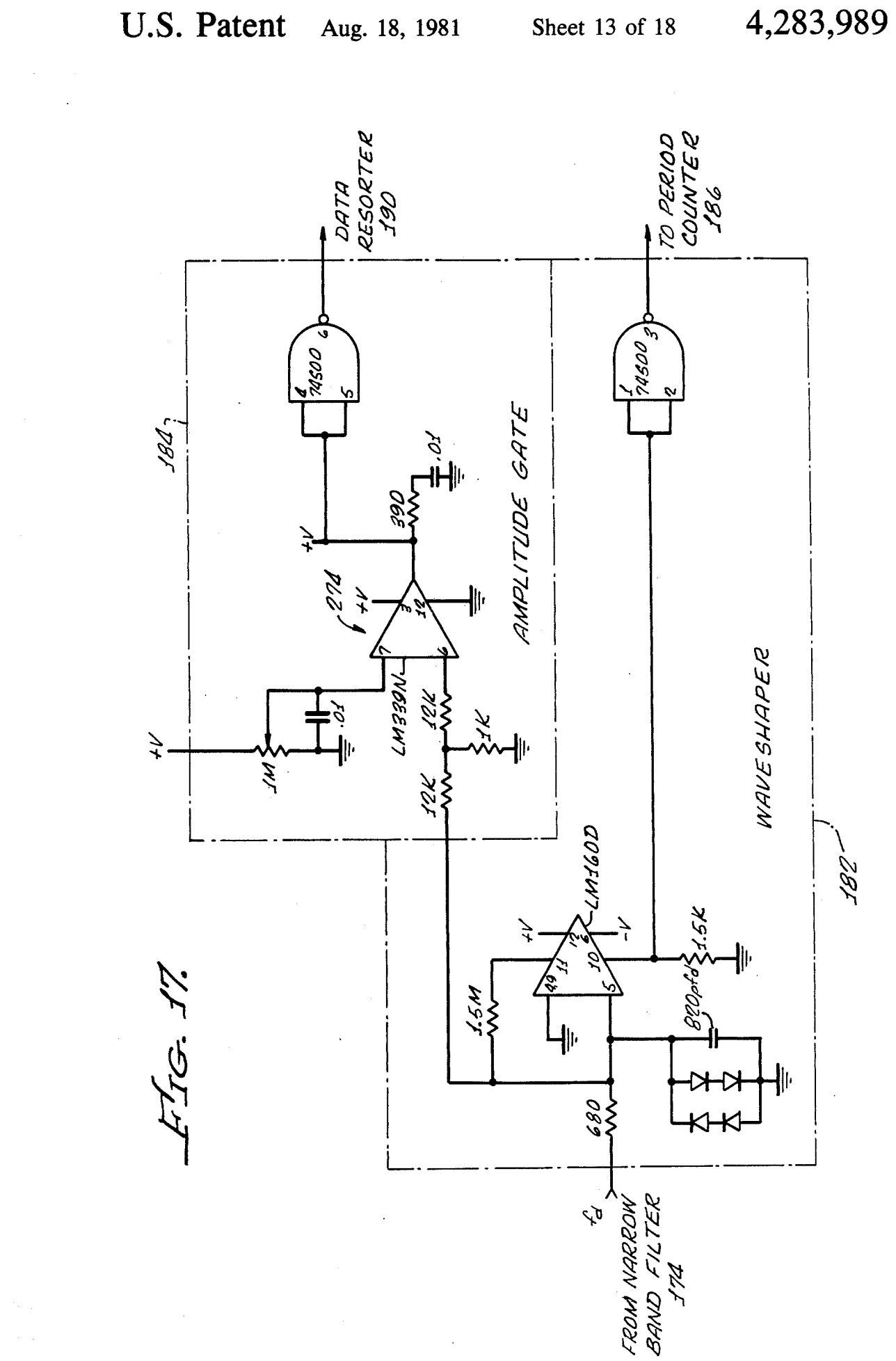

FIG. 17 is a representative electrical schematic drawing of a Doppler wave shaper and amplitude gate portion of the projectile velocity measuring apparatus of FIG. 2;

Figure 18B:
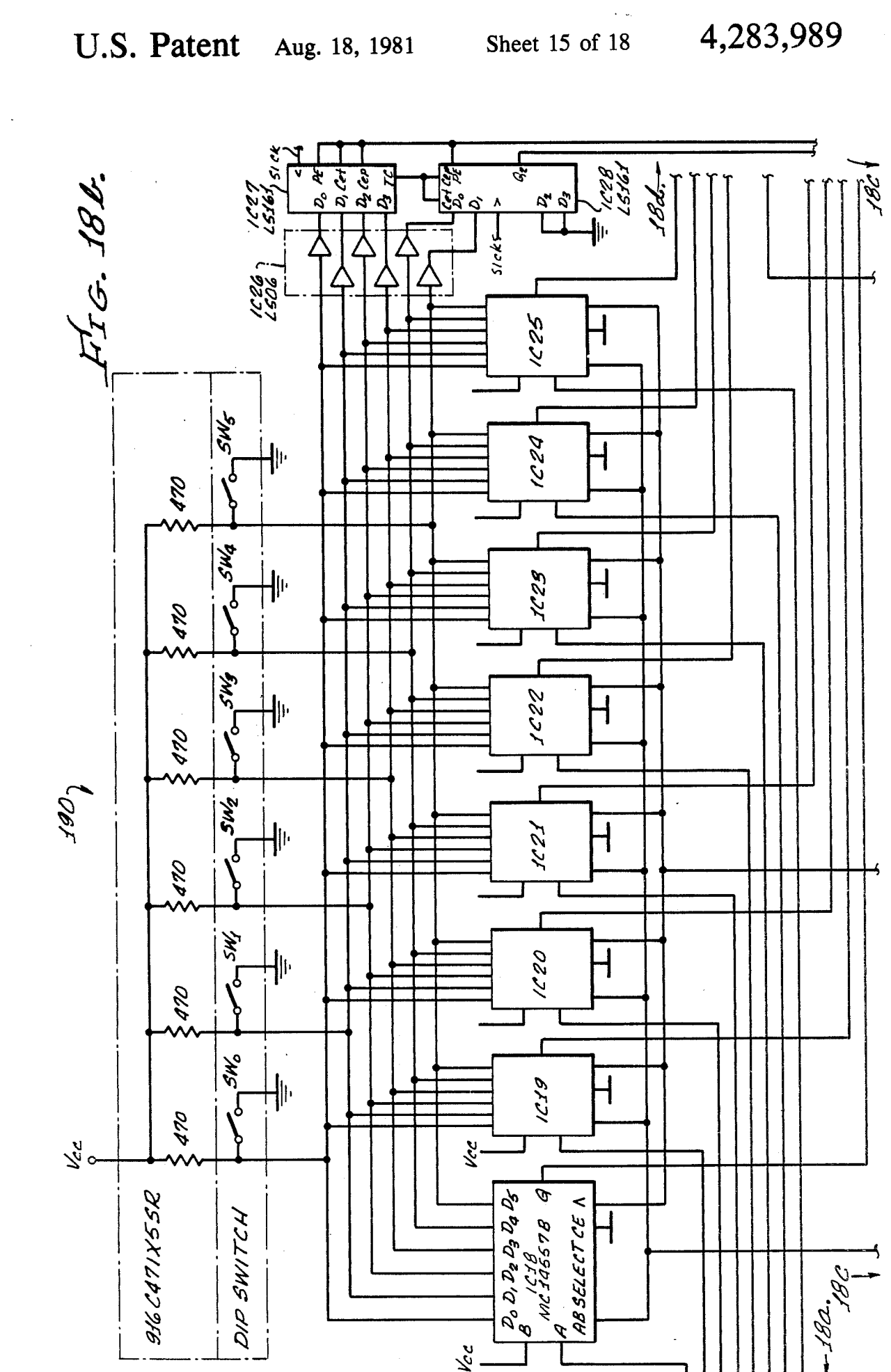

FIG. 18 is a representative electrical schematic drawing of major portions of a data processor portion of the projectile velocity measuring apparatus of FIG. 2 in which FIG. 18 (a) is a representative schematic of a period counter, FIG. 18 (b) and (c) are, in combination, a representative schematic of a data presorter, and FIG. 18 (d) is a representative schematic of an an output buffer; and, FIG. 19 is a state transition diagram for a Doppler period counter portion of the data processor of FIG. 18.

Figure 1:
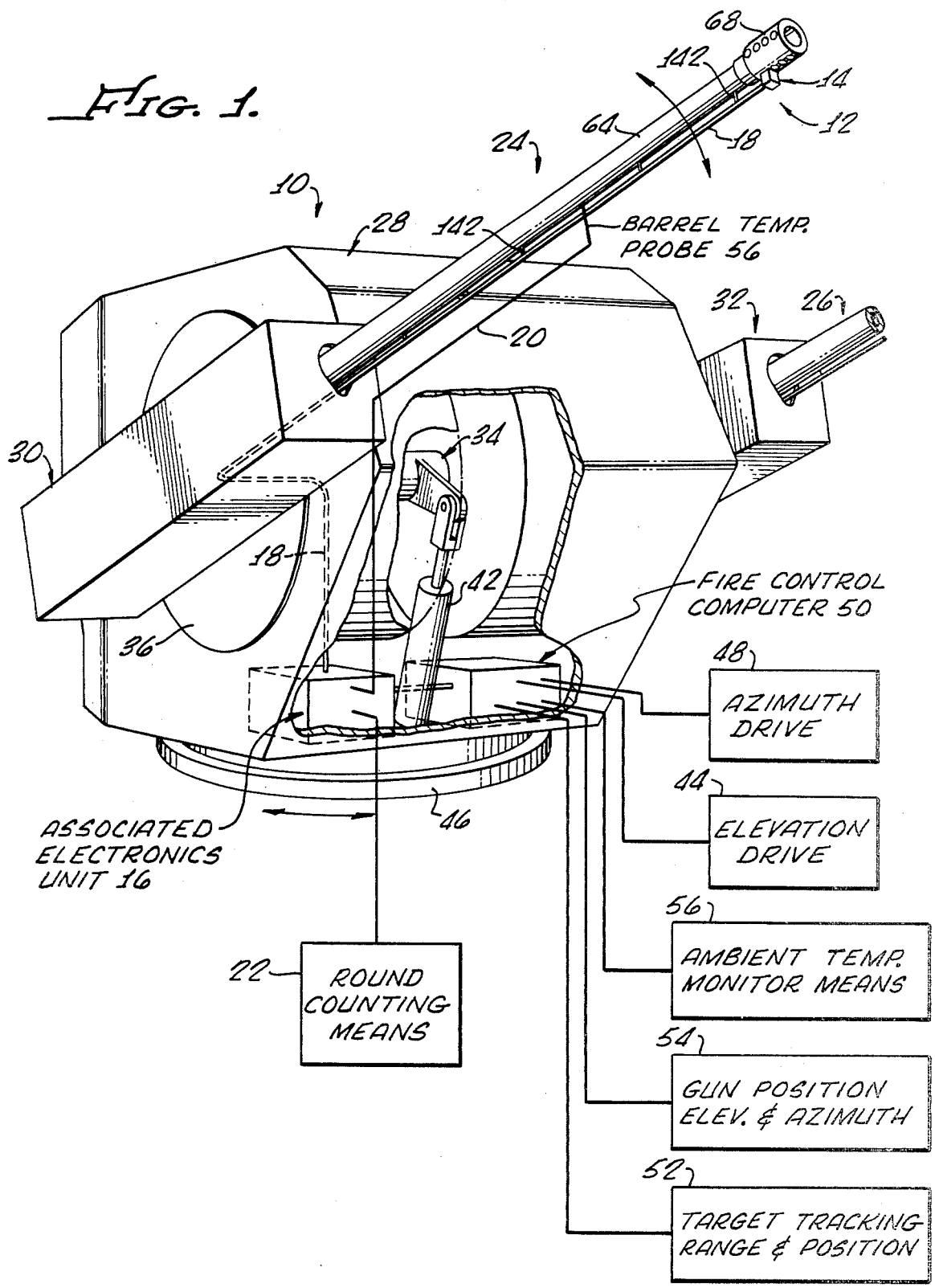
FIG. 1 is a perspective drawing, partially cutaway and partially in functional block form, of an exemplary automatic cannon system employing a Doppler radar-type projectile muzzle velocity determining apparatus, according to the present invention.

Shown in FIG. 1, partially cut away and in partial functional block form, is an exemplary antiaircraft cannon system 10 which incorporates a projectile muzzle velocity determining apparatus 12, according to the present invention. As more particularly described below, the muzzle velocity determining apparatus 12, which utilizes true Doppler radar techniques to determine projectile barrel velocity, comprises generally a cylindrical waveguide-type microwave transmitting-/receiving probe or sensor 14, which is connected to an associated electronics unit 16 by a microwave transmission line or means 18. Also shown as forming part of the apparatus 12, and connected to the electronics unit 16, are barrel temperature monitoring means 20 and fired round counting means 22.

Shown by way of illustrative example, with no limitations intended or implied, the antiaircraft cannon system 10, which other than such apparatus 12 forms no part of the present invention, generally includes first and second automatic cannon 24 and 26, respectively, mounted to opposite, external sides of a gun turret or cupola 28 by associated gun cradles 30 and 32. Simultaneous elevational movement of the cannon 24 and 26 is caused by gun elevating means 34, the cradle 30 associated with the first cannon 24 being shown, for illustrative purposes, connected to one exposed, circular end plate 36 of the elevating means. Also included in the elevating means 34 is a hydraulic actuating cylinder 42, shown operatively controlled by elevation drive means 44.

Azimuthal rotation of the entire turret 28, and hence both the cannon 24 and 26, is enabled by rotatably mounting, by conventional means (not shown), the turret to a base 46, which may, for example, comprise part of a weapons system transporter. Azimuth drive means 48 provided azimuthal rotation of the turret 28, relative to the base 46.

Included as part of the antiaircraft cannon system 10 are fire control computer means 50, for example, of digital type, which enable the very rapid system response necessary under combat conditions. Operatively connected to the fire control computer means 50, for providing data thereto and/or receiving instructions therefrom, in addition to the muzzle velocity electronics unit 16, are target tracking means 52 which provide continual target position and range data, and gun elevation and azimuth angular position indicating means 54 which continuously report actual gun aiming position.

Shown also connected, in data transmitting relationship, to the fire control computer means 50, are ambient condition monitoring means 56 which provide data on ambient conditions affecting projectile time of flight, such as air temperature, humidity and wind velocity.

In a typical tracking and firing mode, responsive to target position and range from the target tracking means 52, the fire control computer means 50 predict a near term target aircraft path. Projectile muzzle velocity data from the muzzle velocity determining apparatus 12 and ambient condition data from the monitoring means 56, in conjunction with stored, conventional ballistic tables, enable the fire control computer means 50 to calculate projectile time of flight to the tracked target. Combining the predicted target flight path and calculated projectile-target time of flight, the fire control computer means 50 predict a corresponding gun aiming path, including lead (azimuth) and super elevation. Using this predicted gun aiming path and actual gun azimuth and elevation positional data from the gun position indicating means 54, the fire control computer means 50 provide those signals to the gun elevation drive means 44 and azimuth drive means 48 necessary for moving the cannon 24 and 26 along the predirected aiming path.

Although in the exemplary antiaircraft cannon system 10, each of the two cannon 24 and 26 may be provided with completely independent muzzle velocity determining apparatus 12, such apparatus is shown in FIG. 1 associated with the first cannon 24. When projectile muzzle velocity information is separately provided for each of the cannon 24 and 26, the fire control computer means 50 typically average the muzzle velocity for both cannon. Discrimination provision also may be included, by means of which the fire control computer means 50 reject (does not use) velocity data from one (or both) of the cannon 24 and 26 if the corresponding muzzle velocity is outside a preselected velocity range indicative of proper system operation.

As more particularly described below, in operation the projectile muzzle velocity determining apparatus 12 continually introduces into a barrel 64 of the cannon 24, through the probe 14, microwaves at a reference frequency, $f_o$, selected to cause the barrel to function as a waveguide. As a fired projectile moves in the barrel 64 towards the muzzle, the introduced microwaves are reflected from the projectile and return to the probe 14 at an increased frequency, $f_o + f_d$. The difference in frequency, $f_d$, between the introduced microwave frequency $f_o$ and reflected microwave frequency, $f_o + f_d$, is related to projectile velocity and is the true Doppler frequency. By determining periods or half periods of the Doppler frequency, $f_d$, the electronics unit 16 determines a sequence of projectile velocities, as the projectile nears the cannon muzzle region, for feeding to the fire control computer means 50.

As shown generally in functional block diagram form in FIGS. 2 and 3, the probe 14 is fixed to a muzzle region of the barrel 64. In the exemplary installation shown, the probe 14 is mounted through a preexisting muzzle brake 68, detachably fixed to a muzzle end of the barrel 64; although, alternatively, the probe could be mounted through the barrel. As a result of mounting the probe 14 in the muzzle brake, the probe is slightly beyond an actual muzzle opening 70 of the barrel 64. Positioning of the probe 14 in this manner relatively close to the muzzle opening 70 is important. Since velocity of a fired projectile 72 is determined as the projectile closely approaches the probe 14, such velocity should be determined as closely as possible to the muzzle opening 70 so as to reduce the amount of necessary velocity extrapolation, as is discussed below.

Shown included in the apparatus electronic unit 16, and described below, is a hybrid mixer 74 which is connected to the probe 14 by the transmission line 18. A conventional stable oscillator 76 for providing microwave energy at the reference frequency, $f_o$, is also connected to the mixer 74. Within the mixer 74, electromagnetic waves at the Doppler frequency, $f_d$, are extracted from the reflected waves of frequency $f_o + f_d$, and are fed to preamplifier and filter means 78 for amplifying and filtering.

From the preamplifier and filter means 78, "cleaned up" microwaves at the Doppler frequency, $f_d$, are fed into a processor 80 which, in the manner described below, preferably measures half periods of a selected number of Doppler waves associated with projectile positions near the probe 14. From the processor 80, Doppler wave half period time data, in digital form, is fed to a computer interface unit 82 in which projectile velocity is determined. Because projectile barrel velocity is indirectly a function of barrel diameter, as discussed below, the interface unit 82 also provides compensation for barrel diameter changes caused, for example, by barrel thermal expansion/contraction and by firing wear. To this end, the barrel temperature monitoring means 20 and fired round counting means 22 are connected for feeding data to the interface unit 82.

Examining first principally mechanical aspects of the muzzle velocity determining apparatus 12, the probe 14 is seen in FIGS. 3 and 4 to comprise a rigid, metallic probe body 90 which includes an external body portion 92, a barrel insertable body portion 94 and a detachable, external end cover 96. Axial length of the barrel insertable portion 94 is seen to depend upon wall thickness of the muzzle brake 68 (or of the barrel 64 if the probe 14 is installed through the barrel). Probe length is such that an insertable portion inner end 98 is slightly below an inner brake surface 100, and is thus adjacent to, but completely one of the path of, projectiles passing the probe 14, some projectile clearance being acceptable and desirable to reduce the effect of shock waves on the probe. Thus, no portion of the probe 14 is shot away, either intentionally or accidentally.

Formed axially through both the body portions 92 and 94 is a cylindrical aperture 102. A reduced diameter collar 104 is formed around the aperture 102 adjacent the inner end 98.

Installed into the aperture 102 is a cylindrical dielectric insert 106. Such insert 106, which may, for example, be formed of MACOR glass-ceramic having a dielectric constant, e, of 5.68, has a reduced diameter region 108 adjacent to an inner end surface 110, thereby enabling the insert to be retained, against inward movement, in the body aperture 102 by the collar 104. Constraint of the insert 106 in the aperture 102 is otherwise by the end cap 96. A plurality of screws 112, which may also be used to mount the probe 14 to the muzzle brake 68, attach the cap 96 to the external body portion 92.

Formed radially into the insert 106, so as to be aligned with a probe body side aperture 116, is a small cylindrical antenna receiving recess 118. Threaded into the aperture 116 is a coaxial connector coupling 120 onto which is threaded an end connector 122 of the transmission line 18. Upon connection of the transmission line connector 122 to the coupling 120, a projecting inner conductor end region 124 of the line 18 projects into the insert recess 118, to thereby function as a microwave transmitting and receiving antenna between the transmission line and the probe 14.

Dimensions of the probe 14, as can be appreciated, are further dependent upon the reference frequency, $f_o$, selected to excite the barrel 64. Assuming, by way of illustrative example only, that the cannon 24 is of 35 mm calibre, and the applied excitation frequency, $f_o$, is accordingly, as described below, selected to be 5.500 GHz (5500 MHz), diameter of the body aperture 102 receiving the described insert 106 is made to be approximately 0.625 inches. Total length of the insert 106, is approximately 1.5 inches, the recess 118 being formed approximately one quarter wavelength ($\lambda/4$) away from an outer end surface 126.

Not only does the insert 106 function as a high permittivity medium for efficiently conducting microwave energy through the probe 14, while enabling diameter of the aperture 102 to be much smaller than if the insert were not used, the insert also forms a physical and thermal barrier between the barrel interior and the transmission line 18, as is necessary to protect the line against damage from firing of the cannon 24.

To withstand the high levels of shock, vibration, temperature and pressure caused by firing of the cannon 24, the probe 14 should be strongly constructed. For similar reasons, the transmission line 18, which is routed along the outside of the barrel from the probe 14 to the electronics unit 16 (shown remotely located in a relatively protected position in the turret 28) should also be strongly constructed and supported.

Accordingly, the transmission line 18 may comprise a flexible, high temperature-rated coaxial cable, a center conductor 132 (FIG. 3) of which is of stranded wire configuration. Surrounding the center conductor 132 is a dielectric layer which may be of TFE-type material. A solid copper outer conductor 134, which reduces signal propagation loss, is jacketed by a copper plated steel braid 136. Covering the braid 136 is a dielectric sheath 140. The end connectors 122, (only the one at the probe 14 being shown) are of conventional "TNC" type. To maintain hermeticity of the cable, the transmission line end fittings 122 are preferably factory assembled. Characteristic impedance, $Z_o$, of the line 18 is approximately 50 ohms to match those of the barrel 64 and probe 14. A cable assembly having the described characteristic may, for example, be purchased from the Flexco Microwave Company as their part number F-282-YY-2880-B.

As an alternative to the generally conventional, TFE filled coaxial line 18 described, a semirigid, 50 ohm coaxial cable filled with silicon dioxide may be used to advantage in some systems. Such a coaxial line having a solid copper outer conductor and a copper lined, stainless steel jacket and hermetically sealed can be obtained from the Electronics Research Corporation. The line is available with TNC or other standard end connectors or in a configuration adapted for end welding, for example, to the probe body 92.

As seen in FIG. 1, the transmission line 18 is supportedly attached to the barrel 64 by a plurality of longitudinally spaced apart clamp assemblies 142, which space the line slightly away from the barrel.

Alternatively, as shown in FIG. 5, the line 18 may include a small, dielectric filled waveguide 144 formed into and along the barrel 64. Typical of end connections to the waveguide 144 is an end connector 146 adjacent the probe 14. A short coaxial line 148 extends between the end connector 146 and the muzzle brake mounted probe 14. Alternatively, the probe 14 may be installed through the barrel 64 at the location of the connector 146, thereby permitting direct connection between the waveguide 144 and the probe, and eliminating the line 148.

Considering next electrical aspects of the apparatus 12, microwave energy is directed to the barrel 64, through the hybrid mixer 74, transmission line 18, and probe 14 from the stable oscillator 76. To provide readily analyzed Doppler data, only the fundamental, or $TE_{11}$, electromagnetic mode is excited or propagated in the barrel 64. If more than one electromagnetic mode is excited, interference may occur in the reflected waves containing the Doppler frequency, $f_d$, or more than one reflected frequency may be obtained. Accordingly, frequency of the oscillator, 76 is selected to be between the barrel cutoff frequencies of the $TE_{11}$ mode and the next higher, $TM_{01}$, mode. If the frequency $f_o$, is selected to be below the $TE_{11}$ cutoff frequency in the barrel 64, no wave propagation occurs and no reflected wave is obtained. If $f_o$ is above the $TM_{01}$ cutoff frequency, at least one higher mode of propagation occurs, with resultant difficulties of obtaining and analyzing Doppler frequency, $f_d$, data.

Cylindrical or circular waveguides, such as is the barrel 64, have a cutoff frequency, $f_c$, of the $TE_{11}$ mode given by the well known relationship:

$$f_c = \frac{6.9185}{D \sqrt{e_r}} \text{ GHz,} \tag{1}$$

where $D$ is the waveguide inner diameter (in inches), and $e_r$ is the dielectric constant of the waveguide medium (equal to about 1 for an air filled waveguide).

The cutoff frequency, $f_{cl}$, of the next higher, $TM_{01}$, mode in cylindrical waveguides is given by the equation:

$$f_{cl} = 1.306 \, f_c \tag{2}$$

However, cannon barrels, such as the barrel 64, have two inner diameters, one for the grooves and another for the lands. Further assuming, for illustrative purposes only, that the barrel 64 is configured for firing 35 mm projectiles, these two inner diameters, $ID_{max}$ and $ID_{min}$, are nominally 1.427 and 1.381 inches, respectively for new barrels. Applying known waveguide resonator techniques on a short sample of barrel, and as more particularly described below, an effective electrical barrel diameter, $D_{eff}$, has been determined to be 1.421 inches.

Substituting 1.421 inches for D in equation (1), the fundamental mode cutoff frequency, $f_c$, in the barrel 64 is found to equal 4.869 GHz. From equation (2), it follows that the next highest mode cutoff frequency, $f_{cl}$, equals 6.359 GHz.

Accordingly, for single mode operation, frequency, $f_o$, of the oscillator 76 is selected to be between 4.869 and 6.359 GHz. Good practice dictates that $f_o$ should be selected to be as far as practical above the $TE_{11}$ cutoff frequency, $f_c$, since as the excitation frequency approaches cutoff, waveguide attenuation increases rapidly. Also, guide (barrel) wavelength, $\lambda_g$, increases and guide phase velocity decreases as frequency decreases, requiring longer physical length of measurement in the barrel 64 to observe the Doppler waveform over a given time frame. In consideration of the above, the oscillator frequency was selected to be a nominal 5.5 GHz, the oscillator 76 providing a measured $f_o$ of 5.500022 GHz, (the value of $f_o$ generally used below by way of example).

Wave transmission between the oscillator 76 and the hybrid mixer 74 is through a conventional coaxial cable 150 (FIG. 2) which may, for example, comprise a section of type RG 141 miniature, rigid coaxial line having standard RF end connectors (not shown).

When microwave energy at the reference frequency, $f_o$, is transmitted through the probe 14, down the barrel 64, microwave energy is reflected back towards, and is received by, the probe. Assuming the projectile 72 has been fired and is traveling along the barrel at a variable velocity, V, dependent upon projectile position in the barrel, the reflected waves will have the frequency, $f_o + f_d$, which is greater by the Doppler frequency, $f_d$, than the applied frequency, $f_o$. Because Doppler frequency, $f_d$, is related to projectile velocity, in the manner hereinafter described, $f_d$ increases as the projectile 72 accelerates down the barrel 64 after firing.

In addition to the reflected energy waves of frequency $f_o + f_d$ returning through the probe 14, some energy of frequency, $f_o$, which is reflected from the electrical mismatch where the cable inner conductor 124 excites fields in the probe aperture 102, is transmitted to the mixer 74 through the transmission line 18, as indicated in FIGS. 2 and 6. The mixer 74 operates to extract energy at the Doppler frequency, $f_d$, from the reflected energy at the frequency, $f_o+f_d$, since only the Doppler data is to be used in obtaining projectile velocity.

Design of the hybrid mixer 74 is accordingly dependent not only on applied frequency, $f_o$, but upon the expected Doppler frequency, $f_d$, to be extracted. Continuing with the example of the 35 mm projectile, a projectile muzzle velocity, V, is expected to be approximately 3855±250 ft/sec, as obtained either experimentally or from the shell manufacturer.

For the cylindrical waveguide barrel 64, Doppler frequency, $f_d$, is related to projectile velocity, V, by the equation:

$$f_d = (2V)/(V_g)f_o, \quad (3)$$

in which $V_g$ is the waveguide phase velocity in the barrel 64.

In turn, waveguide phase velocity, $V_g$, is related to the waveguide wave length, $\lambda_g$, by the formula:

$$V_g = \lambda_g f_o. \quad (4)$$

Thus, it follows that:

$$f_d = \frac{2V}{\lambda_g}. \quad (5)$$

For cylindrical waveguides, as is found in microwave texts, the waveguide wave length, $\lambda_g$, is determined from the relationship:

$$\lambda_g = \frac{\lambda_o/\sqrt{e_r}}{\sqrt{1-(f_c/f_o)^2}}, \quad (6)$$

Wherein $\lambda_o$ is the free space wave length, the terms $e_r$ and $f_c$ having previously been defined.

From equations (1), (5) and (6), for the stated effective barrel diameter of 1.421 inches (D in equation (1)) and for an assumed projectile velocity, V, of about 3855 ft/sec, the expected Doppler frequency $f_o$, is determined to be approximately 20 KHz. Accordingly, the hybrid mixer 74 is constructed, for the present example, to extract a Doppler frequency of approximately 20 KHz from the reflected signal, $f_o+f_d$, which has corresponding frequency of 5.500 GHz plus 20 KHz.

To accomplish this Doppler frequency extraction, the hybrid mixer 74, as shown in FIG. 7, includes a branch line hybrid 154 (more fully described below) as a power divider; a mixer diode 156, for example, a Shottky barrier diode; a low pass filter 158 and a termination 160.

Power from the oscillator 76, at frequency $f_o$, is divided in the branch line hybrid 154 into half, with one half absorbed in the termination and the other half fed through the line 18 to the probe 14. At the probe 14, most of the applied power is coupled into the barrel 64, the remainder being reflected back to the branch line hybrid 154 where it serves as a "L.O." (local oscillator) pump for the mixer diode 156. This pump signal, at the frequency $f_o$, and the projectile reflected "dynamic" signal, at the frequency of $f_o+f_d$, are mixed in the mixer diode 156 to produce or extract the desired Doppler signal at frequency $f_d$. The low pass filter 158 to which is fed the $f_d$ signal from the mixer diode 156 is configured to block any portion of the signal of frequency $f_o$ from reaching the preamplifier and filter means 78, and thus the processor 80.

As seen in FIG. 7, the preamplifier and filter means 78 includes a preamplifier 168 and a filter circuit 170. The preamplifier 168 may, for example, comprise a two stage, broadband AC coupled FET amplifier configured for common source operation and having an input impedance of approximately 100 K ohms. As described below in conjunction with exemplary circuits, the filter circuit 170 preferably comprises a wide band filter 172 formed of a cascaded series of first order lowpass and highpass filters, and a narrow band filter 174 formed of a low Q (approximately equal to 5), second order, biquad-type bandpass filter. Purpose of the amplifier and filter means 78 is to amplify the Doppler signal at frequency, $f_d$, from the hybrid mixer 74 and to remove any higher order frequency noise, to thereby provide a "clean" Doppler signal 164 (FIGS. 6(b) and (c)) enabling accurate processing in the processor 80.

As can be seen from equations (3) and (5), the Doppler signal 164, at frequency $f_d$, results from frequency modulation of the reference frequency ($f_o$) by projectile movement in the barrel 64. As a consequence, the Doppler frequency, $f_d$, is zero at zero projectile velocity, since then both the introduced and reflected signals have the same frequency $f_o$. Thus it follows that, as depicted in FIGS. 6(b) and 6(c), the extracted Doppler signal 164, at frequency $f_d$, can be directly related to projectile position in the barrel (FIGS. 6(a) and (b)) and time interval required for the projectile 72 to travel down the barrel (FIGS. 6(a) and (c)).

Thus, the Doppler signal 164, at frequency $f_d$, starts at time, $t_o$, when the fired projectile 72 starts moving from an "at rest", breech position, $X_L$. When the projectile 72 reaches a probe interference barrel position, $X_f$, at a time, $t_f$, the Doppler signal 164 rapidly diminishes and then ceases. As seen in FIG. 6, an instant later, at time $t_f'$, when the projectile 72 has traveled to a position $X_f'$ just past the probe 14, the probe starts picking up microwave energy, at frequency, $f_o-f_d'$, reflected from the departing projectile. This results in a short Doppler signal 174, of frequency $f_d'$ which decays rapidly as the projectile exits the muzzle brake 68, It is emphasized that both the Doppler frequencies $f_d$ and $f_d'$ are variables depending upon projectile velocity and are hence dependent upon projectile position, x, and time, t, after projectile movement starts.

The mathematical relationship between the Doppler frequency $f_d$ and projectile movement in the barrel, is further developed by considering that the time period, $T_d$, of the Doppler waveform signal is given by the known equation:

$$T_d = (1/f_d). \quad (7)$$

From equations (5) and (7):

$$T_d = (\lambda_g)/(2V). \quad (8)$$

Since in one Doppler period $T_d$, the projectile 72 moves a distance equal to a Doppler wave length, $\lambda_d$, the following relationship exists:

$$\lambda_d = VT_d. \quad (9)$$

Combining equation (8) and (9), the following relationship is obtained:

$$\lambda_d = (\lambda_g)/(2), \tag{10}$$

Inasmuch as $\lambda_g$ has been determined (equation (6)) to be a constant, it is evident from equation (10) that the Doppler wave length, $\lambda_d$, must also be a constant. This is the case even though the Doppler periods, $T_d$, vary inversely with projectile velocity, in accordance with equation (8).

Thus, as depicted in FIG. 6(b) along a distance axis, X, waves of the Doppler signal 164 appear uniformly spaced, with each cycle of wave length $\lambda_d$ corresponding to an incremental barrel length of $\lambda_g/2$. For the specific example being discussed, $\lambda_g/2$ is equal to 2.307 inches. In contrast, when plotted on a time axis (FIG. 6(c)), waves of the Doppler signal 164 are more closely spaced towards the time, $t_f$, corresponding to projectile travel along the barrel 64, consecutive wavelength periods, $T_d$, decreasing due to projectile acceleration.

Combining equations (1), (6) and (8), the following relationship for projectile velocity, V, is obtained.

$$V = \frac{1}{2 T_d} \cdot \frac{\lambda_o/\sqrt{e_r}}{\sqrt{1 - \left(\frac{6.9185}{D\sqrt{e_r} f_o}\right)^2}}. \tag{11}$$

Equation (11) shows the dependency of projectile velocity, V, on the effective barrel diameter D ($D_{eff}$), which thus must be precisely known at the corresponding time projectile velocity is to be determined.

As was mentioned above, effective barrel diameter, D, ($D_{eff}$) for the exemplary 35 mm barrel 24 was experimentally determined to be 1.421 inches. Referring to equations (1) and (6), the following equation for $\lambda_g$ is found:

$$\lambda_g = \frac{\lambda_o/\sqrt{e_r}}{\sqrt{1 - \left(\frac{6.9185}{D\sqrt{e_r} f_o}\right)^2}}, \tag{12}$$

Solving equation (12) for diameter, D, yields the equation:

$$D = \frac{6.9185 \, \lambda_g}{f_o \sqrt{e_r \lambda_g^2 - \lambda_o^2}} \tag{13}$$

Using a 1.821 inch long section of barrel as a resonant cavity, by closing each end with a diaphragm having small central openings of 0.185 inches diameter, the resonant frequency was determined to be 5.800 GHz. Under no load conditions, the cavity length of 1.820 inches is equal to $\lambda_g/2$ at 5.800 GHz. Thus, $\lambda_g$ equals 3.640 inches. Substituting this value for $\lambda_g$ in equation (13), effective barrel diameter for use as the diameter D, is calculated to be the stated 1.421 inches, a dimension lying between the barrel groove and land diameters, as would be expected.

Although initial effective barrel diameter D ($D_{eff}$) can readily be determined in the above described manner, barrel diameter can be expected to change by significant amounts during subsequent use. Barrel diameter thus changes, according to well known thermal expansion relationships, as the barrel heats up during firing, or cools after firing. In addition, barrel diameter gradually increases due to errosion as the number of fired projectiles increases.

Therefore, highly accurate projectile velocity determinations, using equation (11), are obtained treating effective barrel diameter as a variable, with suitable corrections being made, as described below, for barrel thermal expansion/contraction and wear at the time projectile velocity determinations are to be made.

Another factor requiring consideration in configuring the processor 80 is the fact that for a typical cannon barrel, which may be eight to nine feet long, at least 40 to 50 Doppler cycles normally occur for each projectile fired. Although for such uses as determining projectile propellant characteristics, early portions of the Doppler signal 164 (FIGS. 6(b) and (c)) may be used, only the last portion of the Doppler signal obtained as the projectile 72 closely approaches the probe 14 is normally needed for muzzle velocity determinations. Not only are projectile velocity calculations which include use of early Doppler data unnecessarily time consuming and inefficient, but tests indicate that early Doppler data may be unreliable. For example, for some projectile firings, possibly due to gas blowby before complete projectile-barrel sealing, early Doppler data indicates a much higher projectile velocity than appears possible.

As a result, means for Doppler data selection within the processor 80 is provided. Since, however, early Doppler waves may not only be erratic but may be greatly attenuated or even vanish in places, data selection based on starting data acceptance after a preselected number of Doppler cycles have been received is generally unreliable. Alternatively, starting data acceptance a preselected time interval after a firing signal occurs tends to be unreliable because of shell "hang fires" which delay firing.

To limit Doppler data to only that associated with relatively close projectile approach to the probe 14, the processor 80 is configured for retaining, for velocity determination, data on only a selected number, N, of Doppler cycles before the projectile 72 reaches the probe and the Doppler signal disappears.

As is shown generally in FIG. 7, the processor 80 comprises a wave shaper 182 and an amplitude gate 184, a period counter 186, a reference oscillator 188, a data presorter 190 and an output buffer 192.

From the filter circuit 170, the Doppler wave signal 164 (FIG. 6) is fed in parallel to the processor wave shaper 182 and amplitude gate 184. Within the wave shaper 182, the Doppler signal is reshaped from the normal, sine wave shape into a square wave, (FIG. 6(d)), to enable more accurate period determination in the period counter 186 to which the reshaped signal is sent. The amplitude gate 184 provides Doppler signal amplitude information to the presorter 190 in a manner enabling rejection or non-processing of any Doppler waves having an amplitude below a preselected level, thereby eliminating possibly spurious data.

Since the Doppler data is received in a finite burst of information that changes in frequency with projectile velocity change in the barrel 64, Doppler frequency, $f_d$, cannot be directly measured by counting the number of cycles during a preselected time interval. Instead, period measurements of the Doppler signal are made in the period counter 186. Preferably half period, $T_d/2$ measurements are made by counting the number of clock pulses, generated by the reference oscillator 188, that occur within one half of each Doppler cycle, that is, the number of counts between consecutive zero axis crossings of the Doppler signal. Assuming a clock frequency, $f_{ck}$, of the oscillator 188, a half period $T_d/2$ for any Doppler half wave is determined by:

$$T_{d/2} = \frac{n}{f_{ck}} \text{ sec.} \qquad (14)$$

where n is the number of clock pulses counted between consecutive Doppler wave zero axis crossings of the half wave. A total period, $T_d$, for any Doppler cycle comprising two consecutive half periods, is thus determined by the equation:

$$T_d = \frac{n_1}{f_{ck}} + \frac{n_2}{f_{ck}} = \frac{n_1 + n_2}{f_{ck}} \text{ sec.} \qquad (15)$$

where $n_1$ and $n_2$ are the clock pulse counts for consecutive half periods.

Assuming, by way of illustrative example, the clock frequency, $f_{ck}$ (that is, frequency of the oscillator 188) is selected to be $15.7889 \times 10^6$ Hz, equations (14) and (15) reduce, respectively, to:

$$T_{d/2} = \frac{n}{15.7889 \times 10^6} \text{ Sec} \qquad (16)$$

$$T_d = \frac{n_1 + n_2}{15.7889 \times 10^6} \text{ Sec} \qquad (17)$$

Since wave frequency is equal to the reciprocal of wave period, Doppler frequency is readily obtained from equation (17), and is expressed as follows:

$$f_d = \frac{15.7889 \times 10^6}{n_1 + n_2}. \qquad (18)$$

An advantage to making half period, $T_d/2$, measurements rather than full period, $T_d$, measurements, as may alternatively be done, is that, because projectile velocity changes along the barrel, more closely spaced projectile velocity determinations, relatively near the probe 14, are enabled. Thus, for the example discussed herein, velocity determinations are enabled every 1.15 inches along the barrel 64, rather than every 2.30 inches, as would be the case if full period measurements were used.

Within the period counter 186, half period measurements, $T_d/2$, are made for all Doppler half waves received from the wave shaper 182, regardless of region of the Doppler signal 164 from which the waves are obtained and with no discrimination or evaluation being made as to probable validity of the measurements. This stream of half period measurements for the entire Doppler signal 164 is fed by the period counter 186 to the presorter 190 which provides for data selection.

Three modes of half period data selection are preferably provided by the presorter 190. First, any half period measurements, $T_d/2$, from the period counter 186 outside limits selected to provide "reasonable" values of projectile velocity are screened out. As a consequence, those Doppler half wave measurements, $T_d/2$, which would give rise to excessively high or low projectile velocities are eliminated. Secondly, by comparison with corresponding wave amplitude data from the amplitude gate 184, half period measurements for excessively low amplitude waves, which may correspond to Doppler signal regions having other anomalies, are screened out. Furthermore, and importantly, this wave amplitude comparison detects vanishing of the Doppler signal 164, corresponding to the projectile 72 reaching an interference position, $X_f$, relative to the probe 14, enabling the third mode of data selection. In this third mode, the presorter 190 selects (retains) only the above mentioned preselected number, N, of half period measurements, $T_d/2$, corresponding to the projectile 72 being relatively close to the probe 14. Half period data prior to these N measurements is automatically discarded.

This selection of N half period measurements may be achieved, for example, by stepping the measurements, in sequence, into an N-stage shift register-type temporary memory portion 192. When the registers of the memory portion 192 are fully loaded with N half period measurements, as each successive half period measurement is entered, the earliest stored half period measurement is stepped out, and hence lost.

When, by means of signal amplitude comparison, the last valid half period measurement, as the projectile 72 reaches an interference position with the probe 14, is received from the period counter 186 and is entered into the memory portion 192, data stepping through the memory portion stops. When this occurs, the memory portion 192 has stored therein only the last N valid half period measurements.

Since the Doppler signal has typically been found to provide uniformly valid half period measurements as the projectile closely approaches the probe 14, the last N half period measurements retained in the memory portion 192 normally directly correspond to N equally spaced projectile positions in the barrel 64, each, for the discussed example, being equal to 1.15 inches.

After determination is made by the presorter 190 that only the last N half period measurements are stored in the memory portion 192, these measurements are fed to an output buffer 194. Also received by the output buffer 194 are control signals from the period counter 186. From the output buffer 194, the N half period measurements, $T_d/2$, are directed to the interface 82, the buffer functioning to match data flow rates between the presorter and the interface.

Within the interface 82, which may comprise one or more generally conventional data microprocessors, projectile muzzle velocity is determined from the N half period measurements, $T_d/2$, provided from the output buffer 194. In general, such determination comprises:

(a) updating (correcting) barrel diameter D ($D_{eff}$) in accordance with inputs from the barrel temperature monitoring means 20 and the projectile counting means 22, (b) calculating from equation (11), N values of projectile velocity, V, corresponding to the measurements $T_d/2$; and (c) extrapolating or line fitting the series of N calculated projectile velocities to obtain a projectile barrel exit or muzzle velocity, $V_M$.

Assuming the cannon 24 has burst firing capabilities, the interface 82 may additionally be configured to determine an average projectile muzzle velocity, $V_M$ Avg., for the entire burst. Discrimination may be provided during this averaging to eliminate individual, non-typical muzzle velocities which may be associated with defective shells or measurement errors.

Projectile velocity, V, as seen in equation (11), however depends on barrel diameter D (actually on effective barrel diameter, $D_{eff}$), and such diameter changes with barrel temperature due to thermal expansion/contraction and with barrel wear caused by repeated firing of the associated cannon 24. As a result, continual effective barrel diameter updating for each projectile velocity determination is necessary if highly accurate muzzle velocity determinations are to be made.

Although an initial effective barrel diameter can be accurately determined by the above described resonant measurement of a sample length of barrel, continual diameter updating by such means is generally not practical or possible, at least for operational weapons systems in combat situations. Even if accurate relationships between measurable groove and land diameters and effective barrel diameter were determined, thereby enabling periodic wear measurements and corrections, the large barrel temperature fluctuations occurring, for example, during firing of large numbers of projectiles in combat situations, can result in significant, but difficult to measure, effective barrel diameter changes.

Accordingly, to enable required updating, effective barrel diameter correction factors $F_1$ and $F_2$, associated, respectively, with barrel temperature and wear and derived from such curves as those shown in FIGS. 8 and 9 for barrel temperature and number of shells fired, are preferably stored in memory portions of the interface 82. Although, known thermal expansion relationships may be used to calculate variation of effective barrel diameter with barrel temperature, actual calibration curves may be preferred as providing potentially greater accuracy in practice as opposed to theory.

Since individual calibration of all barrels to obtain effective barrel diameter correction factors $F_1$ and $F_2$ may actually be unfeasible, typical or representative calibration curves may be used.

Being provided, by the means 20 and 22, with barrel temperature, $T_B$, and number of rounds, $N_R$, fired through the barrel 64, the interface 82 determines, from the stored data, effective barrel diameter correction factors $F_1$ and $F_2$ appropriate for the projectile (or burst of projectiles) for which muzzle velocity is to be determined. Thus, the actual barrel diameter D used in equation (11) becomes:

$$D = F_1 F_2 D_{eff}, \quad (19)$$

$D_{eff}$ being the initially measured effective barrel diameter.

Combining equations (11) and (19) the formula used for determining projectile velocity becomes:

$$V = \frac{1}{2 T_d} \frac{\lambda_o / \sqrt{e_r}}{\sqrt{1 - \left(\frac{6.9185}{(F_1 F_2 D_{eff} \sqrt{e_r} f_o)}\right)^2}}, \quad (20)$$

where $e_r$ may be assumed a constant having a value of 1.00 for air at standard conditions.

When the series of N projectile velocities, V, has been determined from equation (20), there still remains the determination of projectile muzzle velocity, $V_M$. In this regard, it should be recalled that each of the N projectile velocities is directly associated with a corresponding, known barrel position. Thus, as shown in graph form in FIG. 10, for an illustrative projectile firing having N selected to be 24, a sequence of 24 projectile velocities $V_1$-$V_{24}$ is plotted along a projectile barrel travel axis, x. For convenience, barrel distance in FIG. 10 is measured towards the breech from the muzzle end 70 of the barrel 64.

For the described, exemplary probe 14 installation in the muzzle brake 68 of a 35 mm cannon, the last Doppler half period, $T_d/2$, associated with the last velocity, $V_{24}$, has been determined experimentally, by manually moving a projectile through the barrel 64, to occur when the projectile 72 is still 7.235 inches from the muzzle end 70 and is presumably still accelerating. Accordingly, projectile muzzle velocity, $V_M$, is expected to be greater than the last measured velocity, $V_{24}$.

Furthermore, although a plot of the velocity points $V_1$-$V_{24}$ against barrel position should ideally lie on either a straight line or a smooth curve, in reality, due to noise and other factors, some scattering of the velocity points typically occurs, as shown in FIG. 10. Accordingly, even if the last projectile velocity, $V_{24}$, were associated with projectile muzzle exit, such velocity would not necessarily be entirely accurate due to data scattering, hence the desirability for N measurements.

Extrapolation or correction of projectile velocities, $V_1$-$V_{24}$, to obtain muzzle velocity, $V_M$, is preferably accomplished by fitting a line 198 (FIG. 10) through such velocity points. Assuming a constant projectile acceleration near the muzzle end 70, or given random scattering of velocity points, a straight line is assumed and is "drawn" in a best fit manner through group of velocity data points. Where barrel distance extrapolation is required, as in the described example, the line 198 is extended beyond the data points $V_1$-$V_{24}$ to a point 200 corresponding to the barrel muzzle end 70. If drawn graphically, the straight line 198 may be visually fit through the group of velocity points $V_1$-$V_{24}$. Preferably, however, conventional mathematical line fitting techniques of least squares or linear regression, which are easily adapted in a known manner to automated data processing, are used to determine the best fit of the line 198 and the extrapolation is done mathematically.

Alternatively, $V_M$ may be determined by calculating projectile acceleration, as the time derivitive of projectile velocity, by employing the familiar equation:

$$V_f^2 = V_o^2 + 2 a S, \quad (21)$$

where $V_f$ and $V_o$ are initial and final velocities, respectively; a is the acceleration (assumed constant) and S is the distance between points associated with $V_f$ and $V_o$. For the present example, equation (21) becomes:

$$V_M = \sqrt{V_{24}^2 + 2a (7.235)} . \quad (22)$$

For the example data plotted in FIG. 10, the difference in projectile velocity between $V_{24}$ (or where the line 198 represents $V_{24}$) and muzzle velocity, $V_M$, is seen equal to approximately 80 feet per second (difference between 3690 and 3770 feet per second), representing an approximate 2.2 percent velocity increase during the last 7.235 inches of barrel. Considering that a muzzle velocity accuracy within at least about 0.5 percent is ordinarily necessary, the importance of accurate velocity extrapolation is apparent.

Ordinarily a best fit straight line through the group of projectile velocity data points $V_1$-$V_{24}$, as depicted in FIG. 10, is more accurate than attempting to best fit a curved line through the data. However, if the velocity points $V_1$-$V_{24}$ clearly indicate a curve, corresponding to non-uniform projectile acceleration, known, higher order curve fitting techniques involving polynomial approximation may be used and may thus be provided for in the interface 82.

In addition to determining muzzle velocity, $V_M$, for each projectile fired, the interface 82 is preferably configured for determining the average muzzle velocity, $V_M$ Avg., for all the projectiles fired in a single burst. Typical bursts, for 35 mm cannon may, for example, be ten rounds. Further, the interface 82 may be configured for screening out these individual and average muzzle velocities, $V_M$, $V_M$ $_{Avg.}$, which fall outside of preselected velocity ranges; and, in the absence of valid muzzle velocity information for a particular firing, the interface may selectively provide substitute data, such as the last valid muzzle velocity or an average of a selected number of recent valid muzzle velocities.

The interface 82 may comprise conventionally hard wired circuitry, programmed PROM's (programable, read only memories) or a software programmed general purpose computer. Either the PROM's or computer may be programmed in known manners to perform the described functions. Although ordinarily the described functions of the interface 82 could alternatively be performed by appropriately configured or programmed fire control computer means, such as the means 50, the described peripheral determination of projectile muzzle velocity, $V_M$ and/or $V_M$ $_{Avg.}$, typically reduces time required for such determination. This is important for fast firing guns, such as 35 mm cannon, which may fire at rates in excess of 550 rounds per minute.

DUAL FREQUENCY VARIATION—FIGS. 11-12

As described above, accurate determination of projectile velocity, $V$ and $V_M$, depends not only upon obtaining accurate Doppler period data, as measured by the apparatus 12, but also accurate, relatively independent determination of barrel diameter characteristics (Ref. equations (11) and (20)). In this respect, various difficulties encountered in accurately determining effective barrel diameter changes due to barrel temperature changes and number of rounds fired were mentioned.

Providing the described barrel diameter correction factors, $F_1$ and $F_2$, (FIGS. 8 and 9) used in equation (20), greatly increases accuracy of projectile velocity determination over that which would otherwise be obtained assuming unchanging barrel diameter. However, some remaining, unknown projectile velocity inaccuracies may still exist, due to difficulty in providing completely accurate $F_1$ and $F_2$ calibrations. For example, assuming the number of rounds fired through the barrel 64 can be accurately counted, different types or even different batches of the same type of shells may cause different wear characteristics. Barrel wear characteristics may further be affected by the rate at which shells are fired, since firing rate influences barrel temperature, and consequently barrel thermal expansion characteristics, at the time of firing.

To circumvent such problems associated with determining barrel diameter changes, microwave energy at two slightly different frequencies may be introduced into the barrel 64, through the probe 14, providing two independent sets of half period data which enable elimination of projectile velocity dependency on barrel diameter, (equation (11)). As a result, the further reduction of equation (11) to equation (20), by use of data exemplified in FIGS. 8 and 9, is unnecessary.

To this end, FIGS. 11-13 illustrate a variation, dual frequency projectile muzzle velocity determining apparatus 12a. In these Figures and the following description of the dual frequency apparatus 12a, features and elements identical to those previously described are given the same reference numbers. Corresponding features and elements are given the original reference number followed by either an "a", or "b", as appropriate. New features and elements are given new reference numbers.

As in the described apparatus 12, the dual frequency apparatus 12a uses the probe 14, shown mounted through the muzzle brake 68, for transmitting microwave energy into, and receiving reflected microwave energy from the associated barrel 64. An associated electronics unit 16a is electrically connected to the probe 14 by the transmission line 18. Subsequently determined muzzle velocity data is transmitted from the electronics unit 16a to the fire control computer means 50.

Included in the electronics unit 16a is a dual hybrid mixer 74a to which first and second stable reference oscillators 76a and 76b, respectively, separately feed corresponding, different reference frequencies $f_1$ and $f_2$.

To assure only lowest mode $TE_{11}$, microwave propagation in the barrel 64, both the frequencies $f_1$ and $f_2$ are selected, in the described manner of selecting the reference frequency $f_0$, to be within the frequency range defined by barrel cutoff frequencies, $f_c$ and $f_{c1}$, of the $TE_{11}$ mode and the next higher, $TM_{01}$, mode. Additionally, the frequencies $f_1$ and $f_2$ are selected so that the frequency difference therebetween, for example, about 100-300 MHz, enables separation, in the dual mixer 74a, of such frequencies and the corresponding, projectile reflected energy at frequencies $f_1+f_{d1}$ and $f_2+f_{d2}$, $f_{d1}$ and $f_{d2}$ being the associated Doppler frequencies caused by projectile movement.

Continuing the illustrative example of a 35 mm cannon having an effective barrel diameter of 1.421 inches and having cutoff frequencies $f_c$ and $f_{c1}$ of 4.869 and 6.359 GHz, respectively, the frequencies $f_1$ and $f_2$ of the oscillators 76a and 76b may be selected at 5.400 GHz and 5.700 GHz, respectively.

Within the dual hybrid mixer 74a, the two Doppler signals at frequencies $f_{d1}$ and $f_{d2}$ are extracted in the manner described for the single Doppler frequency $f_d$, reflected portions of the input signals at frequencies $f_1$ and $f_2$ providing L.O. pumping. From the dual mixer 74a, the Doppler signals at frequencies $f_{d1}$ and $f_{d2}$ are separately fed to first and second preamplifier and filter means 78a and 78b.

The amplified and filtered Doppler signals, at frequencies $f_{d1}$ and $f_{d2}$ are then fed from the preamplifier and filter means 78a and 78b into a dual processor 80a. Within the dual processor 80a, and two Doppler signals are separately shaped into square waves and the corresponding half periods $T_{d1}/2$ and $T_{d2}/2$, are measured, in the manner described for the Doppler signal half period $T_d/2$. From the dual processor 80a, the two sets of half period measurements $T_{d1}/2$ and $T_{d2}/2$ are fed into a dual interface 82a for combining into a single muzzle velocity, $V_M$, as described more fully below.

As shown in FIG. 12, the dual hybrid mixer 74a comprises, in parallel, a pair of hybrid mxers, similar to the above described hybrid mixer 74. Thus, included in the dual mixer 74a are first and second hybrid branch lines 154a and 154b, first and second mixer diodes 156a and 156b and first and second low pass filters 158a and

158b. Interconnection of these elements is made in the manner above described for the hybrid mixer 74 (FIG. 7). A principle variation is that between the first and second hybrid branch lines 154a and 154b and the transmission line 18 are added conventional, first and second high selectively, band pass filters 210 and 212, respectively. These filters 210 and 212 are configured for separating the first set of signals at frequencies $f_1$ and $f_1+f_{d1}$ from the second set of signals at frequencies $f_2$ and $f_2+f_{d2}$, so that only the frequencies $f_1$ and $f_1+f_{d1}$ are fed to the first hybrid branch line 154a, for extracting the first Doppler signal of frequency $f_{d2}$ therein, and only the frequencies $f_2$ and $f_2+f_{d2}$ are fed to the second hybrid branch line 154b, for extracting the second Doppler signal of frequency $f_{d2}$ therein.

Thus, in effect, there exists from the probe 14 to the dual interface 82a, two parallel, separate signals generating and processing portions in which the associated Doppler signals at frequencies $f_{d1}$ and $f_{d2}$ are extracted and in which the associated sets of Doppler half periods $T_{d1}/2$ and $T_{d2}/2$ are measured. For efficiency and cost effectiveness, only a common probe 14 and transmission line 18 are shown used; although, in the dual frequency apparatus 12a, two separate probes and transmission lines could instead be used.

In the dual interface 82a, by means of conventional PROM's or software control of, for example, a digital computer, the separate sets or series of half period measurements $T_{d1}/2$ and $T_{d2}/2$, associated with the separate Doppler signals of frequency $f_{d1}$ and $f_{d2}$, are mathematically combined to determine, independently of barrel diameter, a single sequence of projectile velocities, V. From such single sequence of projectile velocities, a single projectile muzzle velocity, $V_M$, is extrapolated in the manner described above in conjunction with FIG. 10.

In respect to combining the separate half period measurements, $T_{d1}/2$ and $T_{d2}/2$, to eliminate barrel diameter from equation (11), it is to be appreciated that although the two Doppler frequencies $f_{d1}$ and $f_{d2}$, and hence the sequence of the corresponding half period measurements made therefrom, have different values, both are associated with the same projectile velocity profile. That is, the separately determined projectile velocities at any point along the barrel 64, must always be the same.

Thus, from equation (5) it follows that:

$$f_{d1} = \frac{2V}{\lambda_{g1}} \quad (23a)$$

$$f_{d2} = \frac{2V}{\lambda_{g2}}, \quad (23b)$$

wherein $\lambda_{g1}$ and $\lambda_{g2}$ are the corresponding waveguide wave lengths which, from equation (6), are given by:

$$\lambda_{g1} = \frac{\lambda_1/\sqrt{e_r}}{\sqrt{1-(f_c/f_1)^2}} \quad (24a)$$

$$\lambda_{g2} = \frac{\lambda_2/\sqrt{e_r}}{\sqrt{1-(f_c/f_2)^2}}, \quad (24b)$$

$\lambda_1$ and $\lambda_2$ being the free space wave lengths of the frequencies $f_1$ and $f_2$. For convenience, since $\lambda_1$ equals $C/f_1$ and $\lambda_2$ equal $C/f_2$, where C is equal to the velocity of light in free space ($11.80285435 \times 10^4$ feet/sec), equations (24a) and (24b) can be expressed as:

$$\lambda_{g1} = \frac{C}{\sqrt{e_r f_1^2 - f_c^2}} \quad (25a)$$

$$\lambda_{g2} = \frac{C}{\sqrt{e_r f_2^2 - f_c^2}}. \quad (25b)$$

By combining equations (23) and (25), the following relationships for projectile velocity, V, are obtained:

$$V = \frac{f_{d1}}{2} \frac{C}{\sqrt{e_r f_1^2 - f_c^2}} \quad (26a)$$

$$V = \frac{f_{d2}}{2} \frac{C}{\sqrt{e_r f_2^2 - f_c^2}}. \quad (26b)$$

Equations (26a) and (26b) can be arranged as follows:

$$f_c^2 = e_r f_1^2 - \frac{f_{d1}^2 C^2}{4V^2} \quad (27a)$$

$$f_c^2 = e_r f_2^2 - \frac{f_{d2}^2 C^2}{4V^2}. \quad (27b)$$

Equating equations (27a) and (27b), the following single equation is obtained:

$$e_r f_1^2 - \frac{f_{d1}^2 C^2}{4V^2} = e_r f_2^2 - \frac{f_{d2}^2 C^2}{4V^2} \quad (28)$$

Equation (28) can be solved to obtain the following equation for projectile velocity, V, as a function of the first and second oscillator frequencies, $f_1$ and $f_2$; the associated first and Doppler frequencies, $f_{d1}$ and $f_{d2}$, as obtained from half period measurements $T_{d1}/2$ and $T_{d2}/2$, and the dielectric constant, $e_r$, of the barrel air column:

$$V = \frac{C}{2\sqrt{e_r}} \left( \frac{f_{d2}^2 - f_{d1}^2}{f_2^2 - f_1^2} \right)^{\frac{1}{2}}. \quad (29)$$

As is seen from equation (29), projectile velocity, V, obtained by use of the dual barrel exciting frequencies $f_1$ and $f_2$, is independent of barrel diameter, and hence, of the effects of any changes therein due to thermal expansion/contraction and barrel wear. The absence of barrel diameter in equation (29) results from equating $f_c^2$ in equations (27a) and (27b), recalling from equation (1) the inverse dependency of the cutoff frequency, $f_c$, on barrel diameter.

The interface 82a is accordingly configured for determination of a series of projectile velocities, V, (from equation (29)) as a function of corresponding projectile positions in the barrel 64, and from the known frequencies $f_1$ and $f_2$ and the corresponding measured Doppler half periods $T_{d1}/2$ and $T_{d2}/2$, recalling from equation (7) that Doppler frequency $f_d$ is the reciprocal of the Doppler period $T_d$.

Subsequently, as described above in relation to the velocity plot and line fitting and extrapolation of FIG.

10, projectile muzzle velocity, $V_M$, is determined. Projectile muzzle velocity, $V_M$, and/or average projectile muzzle velocity, $V_{M\,Avg.}$, is then fed from the interface 82a to the fire control computer means 50 for use therein in determining projectile-target time of flight.

It can be seen from equation (29) that although projectile velocity, V, is independent of barrel diameter, dependency upon dielectric constant, $e_r$, of the air column in the barrel 64 remains.

In the above description relating to projectile velocity, determined according to equation (11) and (20), the dielectric constant was assumed to be a constant and equal to that of free space at standard conditions. Comparing projectile muzzle velocities, $V_M$, determined by the apparatus 12 with corresponding projectile muzzle velocities obtained in range testing by use of conventional screen-type chronographs, the assumption that $e_r$ is constant appears reasonable.

However, the dual frequency apparatus 12a additionally enables examination of time/space effects on the barrel dielectric constant, $e_r$, in the event, at least for some uses, the assumption that $e_r$ is constant may introduce some error in determining muzzle velocity, $V_M$.

By equating the two expressions for projectile velocity, V, found in equations (26a) and (26b), and by reducing the result, the following equation, giving the dependency on $e_r$ of the frequencies $f_1$, $f_2$ and $f_{d1}$, $F_{d2}$ and $f_{c1}$ is obtained:

$$\frac{f_c}{\sqrt{e_r}} = \left( \frac{f_1^2 f_{d2}^2 - f_2^2 f_{d1}^2}{f_{d2}^2 - f_{d1}^2} \right)^{\frac{1}{2}}, \tag{30}$$

in which the barrel cutoff frequency, $f_c$, is experimentally determined in the manner described above.

Anticipating the $e_r$ will, at most, be a slowly varying function of time near the end of the barrel 64, associated with the selected last N projectile velocity measurements, equation (30) enables definition of an effective dielectric constant, $e_{r\,eff}$. On this basis, equation (29) becomes:

$$V = \frac{c}{2\sqrt{e_{r\,eff}}} \left( \frac{f_{d2}^2 - f_{d1}^2}{f_2^2 - f_1^2} \right)^{\frac{1}{2}}, \tag{31}$$

as may be used by the interface 82a in determining projectile velocity.

PROJECTILE COMMUNICATION VARIATION OF FIG. 13

During operation described projectile velocity determining apparatus 12 or 12a, microwave energy at the applied oscillator frequencies $f_o$ or $f_1$ and $f_2$ impinges on the projectile 72 while the projectile is still in the barrel 64 and for a short distance after the projectile has exited the barrel and is in free flight. Consequently, there exists possibility, for using the apparatus 12 or 12a, modified as described below, to transmit information to, or otherwise communicate with, a suitably equipped projectile by conventional microwave communication techniques. As illustrations of possible application, the modified apparatus 12 or 12a may be used to transmit targeting information to a target-seeking projectile or, after determining projectile velocity, to provide projectile time of flight information to an electronically fused projectile before the projectile is out of transmission range of the probe 14.

To provide the communication function to the preexisting projectile velocity determining apparatus 12 (or in a similar manner to the dual frequency apparatus 12a) communication means 218 are added, as shown in FIG. 13. Comprising the communication means 218 is a signal modulator 220, for example, of conventional frequency modulation (FM) type. The modulator 220 is installed in the line 150 connecting the stable oscillator 76 to the hybrid mixer 74 for modulating the oscillator frequency, $f_o$, in a manner impressing the information to be transmitted to the projectile on the reference input signal.

Further comprising the communicating means 218 and connected to the signal modulator 220 is a conventional driver signal generating means 222, shown also connected to the fire control computer means 50 for receiving information therefrom, such as projectile time of flight, to be transmitted, and coding the information for oscillator signal modulation by the modulator 220. Control signals may also be fed from the processor 80 to the signal modulator 220, for example, to disenable oscillator modulation while desired Doppler signal data is being received by the probe 14. Alternatively, with suitable reflected signal filtering, the reference signal frequency, $f_o$, may be modulated to communicate with the projectile 72 even while Doppler data is being received.

Communication with the projectile 72 while the projectile is still in the barrel 64 is generally preferable over attempting to communicate with the projectile after the projectile has exited the barrel and is in free flight. This is because in the existing configuration of the apparatus 12 (or 12a) little of the reference oscillator energy introduced into the barrel escapes from the barrel, as is intended for the projectile velocity determination function. Increasing the amount of electromagnetic radiation from the barrel has the disadvantage that the external radiation is subject to enemy detection and jamming or use of enemy homing weapons. Furthermore, because of the cloud of ionized gases accompanying the projectile from the barrel, communication with projectiles exiting the barrel may be more difficult than communication while the projectile is in the barrel and moving towards the probe 14.

Within the barrel 64, the projectile 72 may be communicated with before acceptance of the Doppler data from which projectile velocity determinations are made. However, this does not permit feedback, for fuse setting, of porjectile time of flight calculated for that particular projectile, as may be required.

As an alternative, assuming a sufficiently long barrel, the Doppler data may be taken while the projectile 72 is still far enough down the barrel 64 from the probe 14 to enable processing of the Doppler data into projectile time of flight and then communicating time of flight data to the projectile before the dead region occurs as the projectile reaches the probe. For such alternative, an assumption is made that at a point P (FIG. 6) along the barrel, at a distance $X_p$ from the muzzle end 70, the projectile barrel velocity, $V_p$, is related to projectile muzzle velocity, $V_M$, by the expression:

$$V_p = kV_M, \tag{32}$$

where k is a proportionality factor considered sufficiently constant that the muzzle velocity, $V_M$, can still be determined to the requisite level of accuracy using equation (32). Typically, the distance $X_p$ is between a quarter and a half of the barrel length to allow sufficient Doppler data processing time while still permitting the projectile 72 to reach a barrel position wher the Doppler data is expected to be valid.

For particular barrels and/or types of projectiles, the factor k in equation (32) is obtained during test firings by receiving and analyzing Doppler data over the entire length of the barrel. In such manner, the point $X_p$ at which the Doppler data is cut off is also determined.

If, however, time of projectile flight information is to be transmitted to the same projectile and the barrel 64 is insufficiently long to permit receiving good Doppler data necessary for use of equation (32), and determining time of flight therefrom in time to transmit the information to the projectile 72 before it reaches the probe 14, communication to the projectile in free flight is necessary.

Communication with the projectile 72 in free flight out to a distance of, for example, several hundred yards from the muzzle end 70 is enabled, as described below, by forming the end of the muzzle brake 68 (or otherwise the end of the barrel (64) into a more efficient, transmitting antenna configuration and preferably also reducing the oscillator frequency, $f_o$, below the barrel cutoff frequency, $f_c$, so that most of the applied microwave energy is transmitted from the end of the barrel.

As shown in FIG. 13, a muzzle brake 224 having improved microwave transmission characteristics is installed on the barrel 64. The modified muzzle brake 224 is formed having a conical aperture 226 at an open end 228 thereof. Angular opening of the conical aperture 226 is preferably about 30 degrees and length of the conical region is, for a 35 mm cannon, about 6 inches, a gain of about 20 db being thereby provided.

Since external transmission characteristics are further improved if the oscillator frequency, $f_o$, is below the barrel cutoff frequency, $f_c$, for the exemplary 35 mm barrel having a cutoff frequency of 4.869 GHz, microwave transmission generally along the barrel axis, outside the muzzle brake 224, is greatly enhanced by reducing $f_o$, for example, to about 4.76 GHz, in order that energy reflected back from the "cut-off" barrel be in phase with the energy propagating from the probe toward the aperture.

To obtain Doppler data for determining projectile velocity while the projectile 72 is in the barrel 64 and to permit effective communication with the projectile after the projectile exits the barrel, conventional frequency switching means 230, connected to the oscillator 76 and responsive, for example, to control signals from the processor 80, may be used to switch oscillator frequencies. In the example given, output frequency, $f_o$, of the oscillator 76 is thus switched from 5.500 GHz to 4.76 GHz after the last desired Doppler traces are received and before communication with the projectile in free flight.

It is to be appreciated that advantage can also be taken of such enhanced external transmission characteristics to obtain extended Doppler data after the projectile 72 leaves the barrel 64 and brake 224, as may sometimes be desired in addition, or as an alternative, to obtaining Doppler data only while the projectile is still in the barrel. For such use, corresponding data handling modifications are required in the processor 80 and in configuration or programming of the interface 82, since for such external Doppler data, barrel waveguide characteristics no longer apply and the relationship for projectile velocity is simply that for free space (from equation (5))

$$V = \frac{f_d \lambda_o}{2}, \tag{33}$$

where, as before, $\lambda_o$ is the free space wave length of the applied frequency.

Although the described means 218 for communication with the projectile 72, while the projectile is still within the barrel 64 or after the projectile has exited the barrel, has been shown used, for illustrative purposes, with the single frequency velocity determining apparatus 12, it may used, in a similar manner, to similar advantage, with the dual frequency apparatus 12a.

It is further to be appreciated that if only the described communication with the projectile 72 is required, those portions of the apparatus 12 (or 12a) related to Doppler signal receiving and processing can be eliminated, the remaining portions with the communication means 218 added being all that is required.

EXEMPLARY CIRCUITS OF FIGS. 14–19

The above described functional blocks, representing circuit portions of the apparatus 12 and 12a, can be implemented in various manners known to those skilled in the art. However, by way of specific illustrative example, with no limitations intended or implied, the hybrid mixer 74 may be implemented as shown in FIG. 14 which represents to scale the mixer constructed in microstrip form. That is, FIG. 14 represents printed circuitry 240 applied over a dielectric layer 242 ($e_r = 10$) which is, in turn, applied over a ground plane 244.

In FIG. 14 are shown external coaxial connections 246, 248 and 250, respectively, for connecting the mixer 74 to the filter and preamplifier means 78, the transmission line 18 (to the probe 14) and the line 150 to the stable oscillator 76. Specifically identified within the circuitry 240 of the mixer 74 are those portions associated with the hybrid branch line 154, the low pass filter 158 and the termination 160. Although the printed circuitry 240 is not entirely covered or coated, a lossy overlay strip 252 is applied over the portion of the circuitry 240 associated with the termination 160.

Also identified is location of the mixer diode 156, which is installed between adjacent portions of the circuitry 240. A D.C. feed through pad 254 to ground is also identified.

By way of reference, for an applied frequency, $f_o$, of 5.500 GHz and an expected Doppler frequency of about 20 KHz, overall dimensions of the mixer 74, as embodied in FIG. 14, are 2.50 inches by 1.00 inches, with the layout shown being substantially to scale.

In FIG. 15 as shown, again for illustrative purposes, an exemplary embodiment of the above described wideband filter portion 172 of the filter circuit 170. As shown, the wideband filter portion 172 comprises generally a series arrangement of first and second high pass filters 256 and 258, respectively, having cornering frequencies of 25 KHz, followed by first and second low pass filters 260 and 262, respectively.

For the approximate 20 KHz Doppler frequency, $f_d$, the components and values thereof, where applicable, are as shown in FIG. 15.

FIG. 16 illustrates a manner of implementing the narrowband filter portion 174 of the filter circuit 170, to which the $f_d$ signal from the wideband filter portion 172 is fed. As stated above, the filter portion 174 comprises generally a low Q (about 5), second order, biquad-type band pass filter, the components and values thereof, as applicable, being as shown.

FIG. 17 illustrates an embodiment of a circuit combining the wave shaper 182 and amplitude gate 184. The wave shaper 182 digitizes the Doppler signal, $f_d$, from the preamplifier 168, thus rendering the signal compatible with the input of the processor 80. The amplitude gate 184 supplies amplitude information to the processor 80 in such a manner to eliminate operation on wave cycles of excessively low amplitude.

In operation, the Doppler signal, $f_d$, is delivered to the input of a LM160D integrated circuit 270 through a 680 ohm resistor. The signal is compared with ground to generate a TTL compatible output. A "zero" state represents a negative voltage level and a "one" state represents a positive level. The output of the LM160D circuit 270 is buffered through a 7400 circuit 272 to increase the fanout capability.

In the amplitude gate 184, the Doppler signal is also compared to a preset voltage level. At the output of a LM339N integrated circuit 274 there exists an asymmetrical waveform that is generated when the amplitude of the Doppler signal exceeds the preset level. The output of the LM339 circuit 274 is buffered through a 74S00 circuit 276 to increase the fanout.

Shown combined in the illustrative circuit of FIG. 18 are the period counter 186, reference oscillator 188, presorter 190 and output buffer 142, all of which comprise major portions of the processor 80 (Ref. FIG. 7). For convenience and clarity conventional circuitry designations will generally be used.

The period counter 186 performs the following functions: (1) background noise rejection, (2) signature recognition, and (3) measurement of the Doppler frequency. Counter output is in a form suitable for interfacing with the computer means 50, which is preferably a digital computer.

More specifically, the stable reference oscillator 188 is used as a system clock. There is a chain of 3 high speed TTL counters IC 3. The four states (as shown in FIG. 19) are:

(1) Count
(2) Reset NOISE Latch and Count
(3) Setup (meet setup time requirements)
(4) Latch and Load The controller IC 3 is composed of a shift register IC 1 and several exclusive-OR gates IC 3. There is also a NAND gate IC 10 used for decoding state two. In state one, the counter chips are enabled and proceed counting the clock pulses. During this state, the contents of the shift register IC 1 are homogenous.

After the input changes state, this change is passed on to $Q_o$ on the next clock transition, entering state 3. In this state, the counter is stopped (the CET line on the first counter in the chain is brought to a low level), and the gate on the latch IC 9 is opened to allow the data to stablize. On the next clock pulse, the controller enters state 4. At this time, the data latch IC 9 is latched to the data that was present during state 3. Also, the counter is set for a pre-load to the number 2. This is needed because during states 3 and 4 the counter is not counting. This would yield a count that is consistantly 2 counts low if it were not preloaded to this higher value.

At this point, a decision is made. The controller may follow either of two paths. If the incoming Doppler data from the wave shaper 182 is a logical 1, then the next state is 2, otherwise it is 1. The reason for these states will be discussed below. The counter resumes counting in either of the states (state 1 or state 2).

The $T_d/2$ data stream from the period counter 186 contains much superflous information. In order to limit the required capacity of the information processing and data transmittal portions of the apparatus 12, it is preferable to limit, as much as possible, to those measurements which corresponds to "good" muzzle velocity information. For the purpose of this description, reference will be made to "valid" and "invalid" data, with valid data being that which meets certain criteria as given below.

Examples of "invalid" data include data that is clearly out of the range of possible projectile velocities, data that is obsolete (generated from early projectile motion), or data that appears to be generated by an extraneous source (for example, random noise). The valid Doppler data is extracted from the superfluous data by the presorter 190.

As mentioned above, there are three methods of data selection used in the presorter 190. First, the data must lie within certain numerical bounds. Secondly, the data must also represent the last "N" points that satisfy the first criteria. Finally, the amplitude of the incoming Doppler signal is examined at the amlitude gate input.

The numerical range checking requires that the number output lie between the limits of 400 octal and 777 octal. This set of bounds was chosen because of ease of implementation and because it allows a 9-bit word to be treated as an 8-bit word for communication purposes. This conversion is accomplished by subtracting 400 octal from all data. The resultant of this operation is representable as an 8-bit unsigned integer (this range is 0 to 377 octal or 0 to 255 decimal).

One half of IC 8 is examined by IC 10 to ensure that the number is at least as large as 400 octal. If both of these criteria are satisfied, then the data is passed on to the second stage of signature verification. Otherwise, it is discarded immediately.

The word produced (after having 400 octal subtracted from it) is stored in a shift register that is "N" bits long (IC's 18-25). A pulse is passed to IC 12, a monostable, to keep it in the set condition. After 5 ms have passed without any valid data being fed from the counter 186, the monostable will drop out and the data in the shift register is judged to have only data that represents projectile velocities close to muzzle velocity. If the incoming data is of sufficient amplitude to have generated a pulse during the positive portion of the Doppler cycle from the amplitude gate 184, then a pulse will be generated and supplied to IC 12, a monostable that checks to determine if there has been a long time (5 ms) since the last piece of valid data. If any of the preconditions are not met, the monostable will not be reset and the shift register will not pick up the data from the latch IC 9. The condition for judging the data valid is $(OF + B_8) \cdot [NOISE \cdot (Q_1 \oplus Q_2)]$.

After 5 ms have gone by without any valid data causing IC 12 to remain in the set condition, the presorter 190 enters it's second major phase. At this point, it contains data that is judged valid by all criteria previously mentioned. Now the presorter 190 transfers all this data to the output buffer 192 at a rate of approximately 500,000 bytes/sec. The limit on this rate is the speed of the 3341 FIFO memory chip that is used; although, there is no need to make the transfer any faster. The data is transferred to the FIFO from the shift register, and a code of 377 octal is added to the end as an end of record mark.

The transfer of information from the shift registers into the output buffer 192 is controlled by IC's 26–28, 11 and 13. IC 26 forms the first complement of "N", and this is loaded into IC's 27 and 28. Upon the completion of N+1 counts, the $Q_2$ output of IC 28 goes high, inhibiting the transfer of any more information and allowing the shift register to resume receiving data from the period counter 186 as needed. During the period when the N+1 pulses were being counted by the counter IC 27 and 28, 377 was being loaded into the shift register IC's 18–25 as an end of record mark. The last data transfer made then is that mark, and the shift register is cleared of anything that might be mistaken for data, in case it is erroneously triggered again.

The output buffer 192 is an asynchronous interface designed to allow matcing of the two substantially different data rates of the presorter 190 and the interface 82. An 8-bit wide FIFO is used as a temporary storage element for the data from the presorter 190 before it goes to the interface 82. Data entry and removal from this memory are completely independant of one another. The data at the inputs to IC's 14 and 16 are entered every time the SI line is brought high. The rate of the slow clock is adjusted so that it does not exceed the maximum clock rate of the input under worst case conditions. The data is passed from IC 16 to 17 and from IC 14 to 15 by a full "handshake" between the two chips sets (which were designed to handle this configuration). IC 4 performs a logical AND function on the output status flags, and passes this information on to the bus. IC 29 generates the request for new data by providing a pulse upon receipt of a positive transition on the bus. IC 29 generates a pulse that is of sufficient length to satisfy the requirements of the FIFO memory chip. The data is put directly on the bus by the FIFO memory (IC's 15 and 17 provide bus driving).

Identification of the various circuit elements mentioned is provided on FIG. 18, values of such elements being given where appropriate.

It is emphasized that the circuits shown in FIG. 14–18 are provided by way of illustrating means by which the corresponding functional portions of the apparatus 12 (and 12a) may be implemented and no limitation of the present invention to such circuits is intended or implied.

Directly corresponding to the above described projectile velocity determining apparatus 12 and 12a and means modifying such apparatus to enable communication with the projectile 72, either while the projectile is still within the barrel 64 or after it has exited the barrel, are methods for determining projectile velocity, including muzzle velocity, and for communicating with a projctile. The corresponding method for determining projectile velocity includes, for example, steps of introducing into a barrel microwave energy at at least one selected frequency, extracting the Doppler signal from the reflected microwaves, determining half period (or periods) of a selected number of Doppler cycles, calculating therefrom corresponding projectile velocities and line (or curve) fitting the data to determine muzzle velocity.

Inasmuch as no limitation is implied or intended to limit the Doppler signal period measurements to half or full periods, the terms "period and period measurements" in the above description and in the appended claims, unless specifically limited to half periods and half period measurements are to be broadly construed to include multiple and fractional periods and multiple and fractional period measurements. Accordingly, "period measurements" include, for example, quarter period and double period measurements.

Although there have been described above specific arrangements of microwave Doppler projectile velocity determining and projectile communicating apparatus and corresonding projectile velocity determining and projectile communicating methods in accordance with the invention for purposes of illustrating the manner in which the invention may be used to advantage, it will be appreciated that the invention is not limited thereto. Accordingly, any and all modifications, variations or equivalent arangements which may occur to those skilled in the art should be considered to be within the scope of the invention as defined in the appended claims.

We claim:

1. Projectile barrel velocity determining apparatus, which comprises:
    (a) a microwave probe;
    (b) means adapted for fixing the probe to a projectile barrel adjacent to a muzzle end thereof with a probe inner end adjacent to, but one of the path of projectiles traveling through the barrel;
    (c) microwave oscillator means connected to the probe for providing microwave energy thereto for introduction thereby into the barrel to which the probe is fixed, frequency of said oscillator means being selected to excite a fundamental electromagnetic mode in the barrel;
    (d) mixer means connected to the probe for receiving therefrom microwave energy reflected by a projectile traveling through the barrel, and for extracting therefrom a Doppler frequency signal corresponding to projectile barrel velocity; and,
    (e) processor means connected to the mixer means for receiving the Doppler signal therefrom and for obtaining from the Doppler signal the corresponding projectile barrel velocity.

2. Projectile barrel velocity determining apparatus, which comprises:
    (a) a microwave probe;
    (b) means adapted for fixing the probe to a projectile barrel adjacent to a muzzle end thereof with a probe inner end adjacent to, but out of the path of, projectiles traveling through the barrel;
    (c) microwave oscillator means connected to the probe for providing microwave energy thereto for introduction thereby into the barrel to which the probe is fixed, frequency of said oscillator means being selected to excite a fundamental electromagnetic mode in the barrel;
    (d) mixer means connected to the probe for receiving therefrom microwave energy reflected by a projectile traveling through the barrel, and for extracting therefrom a Doppler frequency signal corresponding to projectile barrel velocity; and,
    (e) processor means connected to the mixer means for receiving the Doppler frequency signal therefrom for obtaining from the Doppler frequency signal the corresponding projectile barrel velocity, said processor means including period counting means for making period measurements of the Doppler frequency signal, for determination of the corresponding projectile barrel velocity.

3. Projectile barrel velocity determining apparatus, which comprises:

(a) a microwave probe;
(b) means adapted for fixing the probe to a projectile barrel adjacent to a muzzle end thereof with a probe inner end adjacent to, but out of the path of, projectiles traveling through the barrel;
(c) microwave oscillator means connected to the probe for providing microwave energy thereto for introduction thereby into the barrel to which the probe is fixed, frequency of said oscillator means being selected to excite a fundamental electromagnetic mode in the barrel;
(d) mixer means connected to the probe for receiving therefrom microwave energy reflected by a projectile traveling through the barrel, and for extracting therefrom a Doppler signal having a varying frequency corresponding to varying projectile velocity in the barrel and,
(e) processor means connected to the mixer means for receiving the Doppler signal therefrom and for obtaining from the Doppler signal a corresponding set of projectile barrel velocities, said processor means including period counting means for making period measurements of the Doppler signal frequency and presorting means for selecting a predetermined number, N, of the period measurements, corresponding to N barrel positions of an associated projectile in which the projectile approaches relatively closely to the probe, said N period measurements being used for determining a corresponding set of N projectile barrel velocities.

4. Projectile muzzle velocity determining apparatus, which comprises:
(a) a microwave probe;
(b) means adapted for fixing the probe to a projectile barrel adjacent to a muzzle end thereof with a probe inner end adjacent to, but out of the path of, projectiles traveling through the barrel;
(c) microwave oscillator means connected to the probe for providing microwave energy thereto for introduction thereby into the barrel to which the probe is fixed, frequency of said oscillator means being selected to excite a fundamental electromagnetic mode in the barrel;
(d) mixer means connected to the probe for receiving therefrom microwave energy reflected by a projectile traveling through the barrel, and for extracting therefrom a Doppler signal having a varying frequency related to a projectile barrel velocity; and,
(e) processor means connected to the mixer means for receiving the Doppler signal therefrom and for obtaining from the Doppler signal corresponding projectile muzzle velocity, said processor means including means for determining a preselected number, N, of projectile barrel velocities corresponding to N projectile barrel positions and means for extrapolating a projectile muzzle velocity from said N projectile barrel velocities.

5. Projectile barrel velocity determining apparatus, which comprises:
(a) a microwave probe;
(b) means adapted for fixing the probe to a projectile barrel having an effective barrel diameter, adjacent to a muzzle end thereof with a probe inner end adjacent to, but out of the path of projectiles traveling through the barrel;
(c) microwave oscillator means connected to the probe for providing microwave energy thereto and introduction thereby into the barrel to which the probe is fixed, frequency of said oscillator means being selected to excite a fundamental electromagnetic mode in the barrel;
(d) mixer means connected to the probe for receiving therefrom microwave energy reflected by a projectile traveling through the barrel, and for extracting therefrom a Doppler signal having a varying frequency related to a projectile barrel velocity; and,
(e) processor means connected to the mixer means for receiving the Doppler signal therefrom and for obtaining, from the Doppler signal and the effective barrel diameter, corresponding projectile barrel velocities, said processor means including means for compensating, while obtaining the projectile velocities, for effective barrel diameter changes caused by thermal expansion/contraction and wear due to passage of projectiles through the barrel.

6. Projectile muzzle velocity determining apparatus which comprises:
(a) a microwave energy transmitting and receiving probe and means adapted for fixing said probe to a projectile barrel relatively adjacent to a muzzle end thereof with an inner end of the probe adjacent to, but out of the path of, projectiles traveling through the barrel;
(b) reference oscillator means connected to the probe for transmitting therethrough and into the barrel to which the probe is fixed, microwave energy at a frequency selected to propagate a fundamental electromagnetic mode in the barrel;
(c) mixer means connected to the probe for receiving therefrom electromagnetic energy reflected from a projectile traveling in the barrel and for extracting therefrom a Doppler signal having a variable frequency related to projectile barrel velocity;
(d) processor means for measuring half periods of the Doppler signal cycles;
(e) means for converting only a selected number, N, the half period measurements associated with projectile movement relatively adjacent to the probe into N corresponding projectile barrel velocities; and,
(f) means for smoothing said N projectile barrel velocities and for determining projectile muzzle velocity from said smoothed velocities.

7. Projectile barrel velocity determining and projectile communicating apparatus which comprises:
(a) a microwave probe;
(b) means adapted for fixing the probe to a projectile barrel adjacent to a muzzle end thereof with a probe inner end adjacent to, but out of the path of projectiles traveling through the barrel;
(c) microwave reference oscillator means connected to the probe for providing microwave energy thereto for introduction thereby into the barrel to which the probe is fixed, frequency of said oscillator means being selected to excite a fundamental electromagnetic mode in the barrel;
(d) mixer means connected to the probe for receiving therefrom microwave energy reflected by a projectile traveling through the barrel, and for extracting therefrom a Doppler frequency signal corresponding to projectile barrel velocity;
(e) processor means connected to the mixer means for receiving the Doppler frequency signal therefrom and for obtaining from the Doppler frequency signal the corresponding projectile barrel velocities; and, (f) means for communicating information to said projectile while the projectile is within transmitting range of the probe, said communicating means including means for selectively modulating the reference oscillator frequency to include the information to be communicated to the projectile.

8. The projectile barrel velocity determining and projectile communicating apparatus according to claim 7, wherein said communicating means includes means forming an outwardly flared aperture at a muzzle end of the barrel beyond the probe, said aperture forming an antenna for enhancing coupling of microwave energy, emitted into the barrel by the probe, into free space beyond the muzzle end, thereby enhancing capability to communicate information to the projectile after the projectile has exited the barrel and is in free flight.

9. The projectile barrel velocity determining and projectile communicating apparatus according to claim 8, including means for stepping the reference oscillator, after the Doppler frequency signal has been received by the processor means and the projectile reaches the probe, from the frequency selected to excite a fundamental electromagnetic mode in the barrel to a second frequency below the barrel cutoff frequency of the fundamental mode, thereby increasing projectile communication range.

10. Projectile barrel velocity determining apparatus, which comprises:
(a) a microwave probe;
(b) means adapted for fixing the probe to a projectile barrel adjacent to a muzzle end thereof with a probe inner end adjacent to, but out of the path of projectiles traveling through the barrel;
(c) first and second reference oscillator means connected to the probe for providing microwave energy thereto for introduction thereby into the barrel to which the probe is fixed, said first and second reference frequencies each being selected to excite a fundamental electromagnetic mode in the barrel;
(d) dual mixer means connected to the probe for receiving therefrom microwave energy reflected by a projectile traveling through the barrel, and for separately extracting therefrom first and second Doppler frequency signals, associated with said first and second reference frequencies and separately corresponding to projectile barrel velocity; and,
(e) processor means connected to the dual mixer means for receiving the first and second Doppler frequency signals therefrom and for obtaining from the Doppler frequency signals the corresponding projectile barrel velocity.

11. Projectile barrel velocity determining apparatus, which comprises:
(a) a microwave probe;
(b) means adapted for fixing the probe to a projectile barrel adjacent to a muzzle end thereof with a probe inner end adjacent to, but out of the path of projectiles traveling through the barrel;
(c) first and second reference oscillator means connected to the probe for providing microwave energy at respective first and second reference frequencies thereto for introduction thereby into the barrel to which the probe is fixed, said first and second reference frequencies each being selected to excite a fundamental electromagnetic mode in the barrel;
(d) dual mixer means connected to the probe for receiving therefrom microwave energy reflected by a projectile traveling through the barrel, and for separately extracting therefrom first and second Doppler frequency signals, associated with said first and second reference frequencies and separately corresponding to projectile barrel velocity; and,
(e) dual processor means connected to the dual mixer means for receiving the first and second Doppler frequency signals therefrom and for obtaining from said doppler frequency signals the corresponding projectile barrel velocity, said processor means including period counting means for making period measurements of the first and second Doppler frequency signals for determination of the corresponding projectile barrel velocity.

12. Projectile barrel velocity determining apparatus, which comprises:
(a) a microwave probe;
(b) means adapted for fixing the probe to a projectile barrel adjacent to a muzzle end thereof with a probe inner end adjacent to, but out of the path of, projectiles traveling through the barrel;
(c) first and second reference oscillator means connected to the probe for providing microwave energy at respective first and second reference frequencies thereto for introduction thereby into the barrel to which the probe is fixed, said first and second frequencies each being selected to excite a fundamental electromagnetic mode in the barrel;
(d) dual mixer means connected to the probe for receiving therefrom microwave energy reflected by a projectile traveling through the barrel, and for separately extracting therefrom first and second varying Doppler frequency signals associated with said first and second reference frequencies and separately corresponding to varying projectile velocity in the barrel and,
(e) dual processor means connected to the dual mixer means for receiving the first and second Doppler frequency signals therefrom and for obtaining from said Doppler signals a single corresponding set of projectile barrel velocities, said processor means including period counting means for making separate sets of period measurements for the first and second Doppler signal frequencies and presorting means for selecting a predetermined number, N, of the period measurements for each said set corresponding to N barrel positions of an associated projectile in which the projectile approaches relatively closely to the probe, the sets of N period measurements being used for determining a single corresponding set of N projectile barrel velocities.

13. Projectile barrel velocity determining apparatus, which comprises:
(a) a microwave probe;
(b) means adapted for fixing the probe to a projectile barrel adjacent to a muzzle end thereof with a probe inner end adjacent to, but out of the path of, projectiles traveling through the barrel;
(c) first and second reference oscillator means connected to the probe for providing microwave energy at respective first and second reference frequencies thereto for introduction thereby into the barrel to which the probe is fixed, said first and second frequencies each being selected to excite a fundamental electromagnetic mode in the barrel and, said frequencies being separated in frequency by about 100 MHz to 300 MHz;

(d) dual mixer means connected to the probe for receiving therefrom microwave energy reflected by a projectile traveling through the barrel, and for separately extracting therefrom first and second varying Doppler frequency signals associated with said first and second reference frequencies and separately corresponding to varying projectile velocity in the barrel and, (e) dual processor means connected to the dual mixer means for receiving the first and second Doppler frequency signals therefrom and for obtaining from said Doppler signals a single corresponding set of projectile barrel velocities, said processor means including period counting means for making separate sets of period measurements for the first and second Doppler signal frequencies and presorting means for selecting a predetermined number, N, of period measurements for each said set corresponding to N barrel positions of an associated projectile in which the projectile approaches relatively closely to the probe, the sets of N period measurements being used for determining a single corresponding set of N projectile barrel velocities independently from effects of barrel diameter changes due to thermal expansion/contraction and firing wear.

14. Projectile barrel velocity determining apparatus, which comprises:

(a) a microwave probe;

(b) means adapted for fixing the probe to a projectile barrel adjacent to a muzzle end thereof with a probe inner end adjacent to, but out of the path of, projectiles traveling through the barrel;

(c) first and second reference oscillator means connected to the probe for providing microwave energy at respective first and second reference frequencies thereto for introduction thereby into the barrel to which the probe is fixed, said first and second frequencies each being selected to excite a fundamental electromagnetic mode in the barrel, said frequencies being separated in frequency by about 100 MHz to 300 MHz;

(d) dual mixer means connected to the probe for receiving therefrom microwave energy reflected by a projectile traveling through the barrel, and for separately extracting therefrom first and second varying Doppler frequency signals associated with said first and second reference frequencies and separately corresponding to varying projectile velocity in the barrel;

(e) dual processor means connected to the dual mixer means for receiving the first and second Doppler frequency signals therefrom and for obtaining from said Doppler signals a single corresponding set of projectile barrel velocities, said processor means including period counting means for making separate sets of period measurements for the first and second Doppler signal frequencies and presorting means for selecting a predetermined number, N, of period measurements for each said set corresponding to N barrel positions of an associated projectile in which the projectile approaches relatively closely to the probe, the sets of N period measurements being used for determining a single corresponding set of N projectile barrel velocities; and, (f) means for extrapolating from the set of N projectile barrel velocities a single projectile muzzle velocity.

15. Projectile barrel velocity determining and projectile communicating apparatus, which comprises:

(a) a microwave probe;

(b) means adapted for fixing the probe to a projectile barrel adjacent to a muzzle end thereof with a probe inner end adjacent to, but out of the path of projectiles traveling through the barrel;

(c) first and second reference oscillator means connected to the probe for providing microwave energy at respective first and second frequencies reference thereto for introduction thereby into the barrel to which the probe is fixed, said first and second reference frequencies each being selected to excite a fundamental electromagnetic mode in the barrel;

(d) dual mixer means connected to the probe for receiving therefrom microwave energy reflected by a projectile traveling through the barrel, and for separately extracting therefrom first and second Doppler frequency signals, associated with said first and second reference frequencies and separately corresponding to projectile barrel velocity;

(e) processor means connected to the dual mixer means for receiving the first and second Doppler frequency signals therefrom and for obtaining from the Doppler frequency signals the corresponding projectile barrel velocity; and, (f) means for selectively modulating at least one of said first and second reference frequencies for communicating information to said projectile while the projectile is within transmitting range of the probe.

16. The projectile barrel velocity determining and projectile communicating apparatus according to claim 15, wherein said communicating means includes means forming an outwardly flared aperture at a muzzle end of the barrel beyond the probe, said aperture forming an antenna for enhancing coupling of microwave energy, emitted into the barrel by the probe, into free space beyond the muzzle end, thereby enhancing capability to communicate information to the projectile after the projectile has exited the barrel and is in free flight.

17. The projectile barrel velocity determining and projectile communicating apparatus according to claim 16, including means for stepping the reference oscillator, after the Doppler frequency has been received by the processor means and the projectile reaches the probe, from the frequency selected to excite a fundamental electromagnetic mode in the barrel to a second frequency below the barrel cutoff frequency of the fundamental mode, thereby increasing projectile communication range.

18. A method for determining projectile barrel velocity, which comprises the steps of:

(a) fixing a microwave probe to a projectile barrel, adjacent to a muzzle end thereof, with an end of the probe adjacent to, but out of the path of, projectiles traveling through the barrel;

(b) introducing into the barrel, through the probe, microwave energy at a reference frequency selected to propagate a fundamental electromagnetic mode in the barrel;

(c) receiving from the barrel, through the probe, microwave energy, at a reflected frequency, reflected from a projectile traveling through the barrel;

(d) mixing microwave energy at the reference and reflected frequencies and extracting from the reflected frequency a Doppler frequency signal related to projectile barrel velocity and projectile barrel position; and, (e) determining from the Doppler frequency signal the related projectile barrel velocity as a function of projectile barrel position.

19. A method for determining projectile muzzle velocity, which comprises the steps of:
 (a) fixing a microwave probe to a projectile barrel, adjacent to a muzzle end thereof, with an end of the probe adjacent to, but out of the path of, projectiles traveling through the barrel;
 (b) introducing into the barrel, through the probe, microwave energy at a reference frequency selected to propagate a fundamental electromagnetic mode in the barrel;
 (c) receiving from the barrel, through the probe, microwave energy, at a reflected frequency, reflected from a projectile traveling through the barrel;
 (d) mixing microwave energy at the reference and reflected frequencies and extracting from the reflected frequency a Doppler frequency signal related to projectile barrel velocity and projectile barrel position; and,
 (e) determining from the Doppler frequency signal at least a number N of related projectile barrel velocities as a function of projectile barrel position while the projectile is in the barrel; and,
 (f) extrapolating from the N projectile barrel velocities a projectile muzzle velocity.

20. A method for determining projectile barrel velocity, which comprises the steps of:
 (a) fixing a microwave probe to a projectile barrel, adjacent to a muzzle end thereof, with an end of the probe adjacent to, but out of the path of, projectiles traveling through the barrel;
 (b) introducing into the barrel, through the probe, microwave energy at a frequency selected to propagate a fundamental electromagnetic mode in the barrel;
 (c) receiving from the barrel, through the probe, microwave energy, at a reflected frequency, reflected from a projectile traveling through the barrel;
 (d) mixing microwave energy at the reference and reflected frequencies and extracting from the reflected frequency a Doppler frequency signal related to projectile barrel velocity and projectile barrel position;
 (e) measuring period lengths of cycles of the Doppler frequency signal; and,
 (f) determining from at least a selected number, N, of measured periods the related projectile barrel velocity as a function of projectile barrel position.

21. A method for determining projectile barrel velocity, which comprises the steps of:
 (a) fixing a microwave probe to a projectile barrel, adjacent to a muzzle end thereof, with an end of the probe adjacent to, but out of the path of, projectiles traveling through the barrel;
 (b) introducing into the barrel, through the probe, microwave energy at a reference frequency selected to propagate a fundamental electromagnetic mode in the barrel as established by determining electrically effective barrel diameter;
 (c) receiving from the barrel, through the probe, microwave energy, at a reflected frequency, reflected from a projectile traveling through the barrel;
 (d) mixing microwave energy at the reference and reflected frequencies and extracting from the reflected frequency a Doppler frequency signal related to projectile barrel velocity and projectile barrel position; and,
 (e) determining from the Doppler frequency signal and the effective barrel diamter, the related projectile barrel velocity as a function of projectile barrel position.

22. The method of determining projectile barrel velocity according to claim 21, including the step of compensating for changes in effective barrel diameter due to barrel thermal expansion/contraction and barrel wear due to firing before determining projectile barrel velocity from the Doppler frequency signal.

23. A method for determining projectile barrel velocity, which comprises the steps of:
 (a) fixing a microwave probe to a projectile barrel, adjacent to a muzzle end thereof, with an end of the probe adjacent to, but out of the path of, projectiles traveling through the barrel;
 (b) introducing into the barrel, through the probe, microwave energy at first and second reference frequencies each selected to propagate a fundamental electromagnetic mode in the barrel as established by determining electrically effective barrel diameter;
 (c) receiving from the barrel, through the probe, microwave energy, at first and second frequencies related to the first and second reference frequencies, reflected from a projectile traveling through the barrel;
 (d) mixing microwave energy at said reference and reflected frequencies and separately extracting from the reflected frequency first and second Doppler frequencies signals related to projectile barrel velocity and projectile barrel position; and,
 (e) determining from the first and second Doppler frequency signals the related projectile barrel velocity, as a function of projectile barrel position, independently from effects of the effective barrel diameter.

24. A method for determining projectile muzzle velocity, which comprises the steps of:
 (a) fixing a microwave probe to a projectile barrel, adjacent to a muzzle end thereof, with an end of the probe adjacent to, but out of the path of, projectiles traveling through the barrel;
 (b) introducing into the barrel, through the probe, microwave energy at a first and second reference frequency each selected to propagate a fundamental electromagnetic mode in the barrel, as established by determining electrically effective barrel diameter;
 (c) receiving from the barrel, through the probe, microwave energy, at first and second reflected frequencies related to the first and second reference frequencies reflected from a projectile traveling through the barrel;
 (d) mixing microwave energy at said reference and reflected frequencies and separately extracting from the reflected frequency first and second Doppler frequency signals related to projectile barrel velocity and projectile barrel position;

(e) determining from the first and second Doppler frequency signals at least a number, N, of related projectile barrel velocities, as a function of projectile barrel position, independently from effects of the effective barrel diameter; and, (f) extrapolating from the N projectile velocities a projectile muzzle velocity.

25. A method for determining projectile barrel velocity and communicating with a projectile, which comprises the steps of:

(a) fixing a microwave probe to a projectile barrel, adjacent to a muzzle end thereof, with an end of the probe adjacent to, but out of the path of, projectiles traveling through the barrel;

(b) introducing into the barrel, through the probe, microwave energy at a reference frequency selected to propagate a fundamental electromagnetic mode in the barrel;

(c) receiving from the barrel, through the probe, microwave energy, at a reflected frequency, reflected from a projectile traveling through the barrel;

(d) mixing microwave energy at the reference and reflected frequencies and extracting from the reflected frequency a Doppler frequency signal related to projectile barrel velocity and projectile barrel position;

(e) determining from the Doppler frequency signal the related projectile barrel velocity as a function of projectile barrel position; and, (f) modulating the reference frequency in a manner enabling communication of information to the projectile.

26. A method for determining projectile velocity, and communicating with a projectile, which comprises the steps of:

(a) fixing a microwave probe to a projectile barrel, adjacent to a muzzle end thereof, with an end of the probe adjacent to, but out of the path of, projectiles traveling through the barrel;

(b) introducing into the barrel, through the probe, microwave energy at first and second reference frequencies each selected to propagate a fundamental electromagnetic mode in the barrel as established by determining electrically effective barrel diameter;

(c) receiving from the barrel, through the probe microwave energy, at first and second reflected frequencies, related to the first and second reference frequencies reflected from a projectile traveling through the barrel;

(d) mixing microwave energy at said reference and reflected frequencies and separately extracting from the reflected frequency first and second Doppler frequency signals related to projectile barrel velocity and projectile barrel position;

(e) determining from the first and second Doppler frequency signals the related projectile barrel velocities, as a function of projectile barrel position, independently from effects of the effective barrel diameter; and, (f) modulating at least one of the first and second reference frequencies in a manner enabling communication of information to the projectile.

27. A method for determining projectile muzzle velocity and communicating with a projectile, which comprises the steps of:

(a) fixing a microwave probe to a projectile barrel, adjacent to a muzzle end thereof, with an end of the probe adjacent to, but out of the path of, projectiles traveling through the barrel;

(b) introducing into the barrel, through the probe, microwave energy having at least one reference frequency selected to propagate a fundamental mode in the barrel;

(c) receiving from the barrel, through the probe, microwave energy, at a reflected frequency, reflected from a projectile traveling through a preselected, partial barrel distance before the projectile reaches the probe;

(d) extracting a Doppler frequency signal from the reflected frequency and determining therefrom at least one corresponding projectile barrel velocity at a corresponding barrel position;

(e) extrapolating from said barrel velocity a projectile muzzle velocity and a projectile time of flight; and, (f) modulating the reference frequency in a manner communicating to the projectile information relating to time of flight.

28. The method for determining projectile muzzle velocity and communicating with a projectile according to claim 27, in which the step of receiving reflected microwave energy from a projectile traveling through a preselected partial barrel distance before the projectile reaches the probe includes preselecting the barrel distance to be sufficiently far from the probe to enable determining projectile muzzle velocity and projectile time of flight and communicating time of flight information to the projectile before the projectile reaches the probe.

29. The method for determining projectile muzzle velocity and communicating with a projectile according to claim 27 including the step of forming a muzzle end of the barrel into a conical, antenna shape and wherein the step of modulating the reference frequency includes modulating the reference signal after the projectile has exited the barrel and is in free flight, the projectile thus being outside the barrel when the time of flight information is communicated thereto.

30. The method for determining projectile muzzle velocity and communicating with a projectile according to claim 29, including the step of reducing the reference frequency to a frequency below the cutoff frequency of the fundamental mode in the barrel before modulating the signal to communicate with the projectile.

* * * * *

UNITED STATES PATENT AND TRADEMARK OFFICE
CERTIFICATE OF CORRECTION

PATENT NO. : 4,283,989
DATED : August 18, 1981
INVENTOR(S) : Peter P. Toulios, et al It is certified that error appears in the above—identified patent and that said Letters Patent is hereby corrected as shown below:

Column 1, line 50: Delete "ragard" and insert --regard--

Column 4, line 65: Delete "an" and insert --and--

Column 5, line 60: Delete "wire" and insert --wave--

Column 7, line 16: Delete "thrugh th" and insert --through the--

Column 17, lines 16-17, equation (3): that part of the equation reading "(2V)/(Vg)fo" should read --$(2V)(f_o)/Vg$--

Column 17, lines 33-37, equation (6): that part of the equation reading "$(f_o/f_o)$" should read --$(f_c/f_o)$--

Column 26, line 64: Delete "mxrs" and insert --mixers--

Column 29, line 27: Delete "$F_{d2}$" and insert --$f_{d2}$--

Column 29, line 54: After "operation" insert --of the--

Column 30, line 51: Delete "porjectile" and insert --projectile--

Column 31, line 5: Delete "wher" and insert --where--

Column 32, line 31: After "represents" insert --,--

Column 32, line 31: After "scale" insert --,--

Column 33, line 60: Delete "stablize" and insert --stabilize--

UNITED STATES PATENT AND TRADEMARK OFFICE
CERTIFICATE OF CORRECTION

PATENT NO. : 4,283,989
DATED : August 18, 1981
INVENTOR(S) : Peter P. Toulios, et al It is certified that error appears in the above—identified patent and that said Letters Patent is hereby corrected as shown below:

Column 35, line 18: Delete "matcing" and insert --matching--

Column 35, line 54: Delete "projctile" and insert --projectile--

Claim 1, line 24: Delete "one" and insert --out--

Claim 21, line 13: Delete "diamter" and insert --diameter--

Claim 22, line 1: Delete "of" and insert --for--

Claim 26, line 42: Delete ":" and insert --;--

Signed and Sealed this

Fifteenth Day of December 1981

[SEAL]

Attest:

GERALD J. MOSSINGHOFF

Attesting Officer

Commissioner of Patents and Trademarks